(12) United States Patent
Condeixa et al.

(10) Patent No.: US 10,057,742 B2
(45) Date of Patent: Aug. 21, 2018

(54) SYSTEMS AND METHODS FOR MANAGING THE ROUTING AND REPLICATION OF DATA IN THE DOWNLOAD DIRECTION IN A NETWORK OF MOVING THINGS

(71) Applicant: Veniam, Inc., Mountain View, CA (US)

(72) Inventors: Tiago Silvestre Condeixa, Aveiro (PT); Ricardo Jorge Magalhães de Matos, Oporto (PT)

(73) Assignee: Veniam, Inc., Mountain View, CA (US)

( * ) Notice: Subject to any disclaimer, the term of this patent is extended or adjusted under 35 U.S.C. 154(b) by 0 days.

(21) Appl. No.: 15/478,181

(22) Filed: Apr. 3, 2017

(65) Prior Publication Data
US 2017/0339510 A1 Nov. 23, 2017

Related U.S. Application Data

(60) Provisional application No. 62/338,145, filed on May 18, 2016.

(51) Int. Cl.
| | |
|---|---|
| G06F 15/16 | (2006.01) |
| H04W 4/70 | (2018.01) |
| H04L 29/08 | (2006.01) |
| H04W 40/02 | (2009.01) |
| H04W 4/38 | (2018.01) |

(Continued)

(52) U.S. Cl.
CPC .............. *H04W 4/70* (2018.02); *H04L 67/10* (2013.01); *H04W 4/38* (2018.02); *H04W 4/40* (2018.02); *H04W 40/02* (2013.01); *H04W 84/18* (2013.01)

(58) Field of Classification Search
CPC .... H04L 67/10; H04L 67/1061; H04W 4/005; H04W 40/02; H04W 84/18
USPC ......................................................... 709/217
See application file for complete search history.

(56) References Cited

U.S. PATENT DOCUMENTS

| | | | | |
|---|---|---|---|---|
| 7,206,861 B1 * | 4/2007 | Callon | .................... | H04L 47/10 370/389 |
| 7,606,370 B2 * | 10/2009 | Lillie | .................... | H04L 63/061 380/247 |

(Continued)

FOREIGN PATENT DOCUMENTS

WO 2012128792 9/2012

OTHER PUBLICATIONS

Whitbeck et al. "Relieving the Wireless Infrastructure: When Opportunistic Networks Meet Guaranteed Delays". May 30, 2011. IEEE. pp. 1-9. (Year: 2011).*

(Continued)

*Primary Examiner* — Imad Hussain
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things). More specifically, systems and methods for managing the routing and replication of data in the download direction in a network of moving things.

30 Claims, 19 Drawing Sheets

(51) Int. Cl.
*H04W 4/40* (2018.01)
*H04W 84/18* (2009.01)

(56) References Cited

U.S. PATENT DOCUMENTS

| | | | | |
|---|---|---|---|---|
| 8,117,303 | B2* | 2/2012 | Fonsen | G06F 17/30902 709/217 |
| 8,443,063 | B1* | 5/2013 | Nelson | H04W 36/0083 709/221 |
| 8,570,962 | B2* | 10/2013 | Gage | H04W 40/24 370/329 |
| 9,271,261 | B1* | 2/2016 | Mauer | H04W 72/00 |
| 2005/0221759 | A1 | 10/2005 | Spadafora et al. | |
| 2006/0221759 | A1 | 10/2006 | Smith et al. | |
| 2006/0265333 | A1* | 11/2006 | Gomes | G06F 21/10 705/57 |
| 2007/0097877 | A1* | 5/2007 | Hoekstra | H04W 48/18 370/252 |
| 2007/0214046 | A1 | 9/2007 | Falchuk et al. | |
| 2008/0046978 | A1* | 2/2008 | Rieger | H04L 41/12 726/4 |
| 2008/0222154 | A1* | 9/2008 | Harrington | G06F 17/30206 |
| 2009/0100128 | A1* | 4/2009 | Czechowski, III | H04L 67/104 709/203 |
| 2009/0129316 | A1* | 5/2009 | Ramanathan | H04L 45/123 370/328 |
| 2009/0182815 | A1* | 7/2009 | Czechowski, III | H04L 67/104 709/206 |
| 2010/0076670 | A1* | 3/2010 | Turner | G06Q 30/0246 701/117 |
| 2011/0055326 | A1* | 3/2011 | Michaelis | H04W 48/08 709/204 |
| 2011/0238751 | A1 | 9/2011 | Belimpasakis et al. | |
| 2011/0310813 | A1* | 12/2011 | Gage | H04W 4/21 370/329 |
| 2012/0258727 | A1* | 10/2012 | Wong | H04W 4/02 455/456.1 |
| 2012/0309425 | A1* | 12/2012 | El Khayat | H04L 67/18 455/456.3 |
| 2013/0211870 | A1 | 8/2013 | Lawson et al. | |
| 2015/0163691 | A1 | 6/2015 | Levi et al. | |
| 2015/0264554 | A1* | 9/2015 | Addepalli | H04W 4/046 370/328 |
| 2015/0350031 | A1 | 12/2015 | Burks | |
| 2016/0105356 | A1* | 4/2016 | Dowdell | H04L 45/22 370/329 |
| 2016/0105523 | A1* | 4/2016 | Dowdell | H04L 45/306 709/230 |
| 2016/0316499 | A1* | 10/2016 | Ahmed | H04W 76/023 |
| 2016/0330675 | A1* | 11/2016 | Reitsma | H04W 48/16 |
| 2016/0366559 | A1* | 12/2016 | King | H04W 4/029 |
| 2017/0149882 | A1* | 5/2017 | Roy | H04L 67/1065 |
| 2017/0272361 | A1* | 9/2017 | Speight | H04L 45/745 |
| 2017/0332259 | A1* | 11/2017 | Hirayama | H04W 24/04 |
| 2017/0339510 | A1* | 11/2017 | Condeixa | H04W 4/70 |
| 2017/0339622 | A1* | 11/2017 | Condeixa | H04W 40/20 |
| 2017/0373979 | A1* | 12/2017 | Speight | H04L 47/24 |
| 2018/0091966 | A1* | 3/2018 | Cooper | H04B 1/082 |

OTHER PUBLICATIONS

Chattopadhyay et al. "Location Aware Opportunistic Bandwidth Sharing between Static and Mobile Users with Stochastic Learning in Cellular Networks". Aug. 15, 2016. pp. 1-16. (Year: 2016).*
Helgason, Olafur Ragnar. "Opportunistic Content Distribution". 2011. pp. 1-128. (Year: 2011).*
Al-Fagih et al. "Routing Schemes for Delay-Tolerant Networks—An Applications Perspective". 2012. pp. 1-42. (Year: 2012).*
Hadiwardoyo et al. "Deploying Public Surface Transit to Forward Messages in DTN". Aug. 2015. IEEE. pp. 1-8. (Year: 2015).*
PCT International Search Report and Written Opinion dated Jul. 26, 2017 for PCT Patent Application No. PCT/US2017/032864.
Int'l Search Report and Written Opinion for PCT/US2017/032860 dated Jun. 9, 2017 (14 pages).

* cited by examiner

SYSTEMS AND METHODS FOR MANAGING THE ROUTING AND REPLICATION OF DATA IN THE DOWNLOAD DIRECTION IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/338,145, filed on May 18, 2016, and titled "Systems and Method for Managing the Routing and Replication of Data in the Download Direction in a Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; U.S. Provisional Application Ser. No. 62/257,421, titled "Systems and Methods for Delay Tolerant Networking in a Network of Moving Things," filed Nov. 19, 2015; U.S. Provisional Application Ser. No. 62/299,269, titled "Systems and Methods for Automating and Easing the Installation and Setup of the Infrastructure Supporting a Network of Moving Things," filed on Feb. 24, 2016; U.S. Provisional Application Ser. No. 62/338,135, titled "Systems and Methods for Managing the Routing and Replication of Data in the Upload Direction in a Network of Moving Things," filed on May 18, 2016; U.S. Provisional Application Ser. No. 62/338, 151, titled "Systems and Methods for Managing the Scheduling and Prioritizing of Data in a Network of Moving Things," filed on May 18, 2016; and U.S. Provisional Application Ser. No. 62/338,157, titled "Systems and Methods for Managing the Storage and Dropping of Data in a Network of Moving Things," filed on May 18, 2016, each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
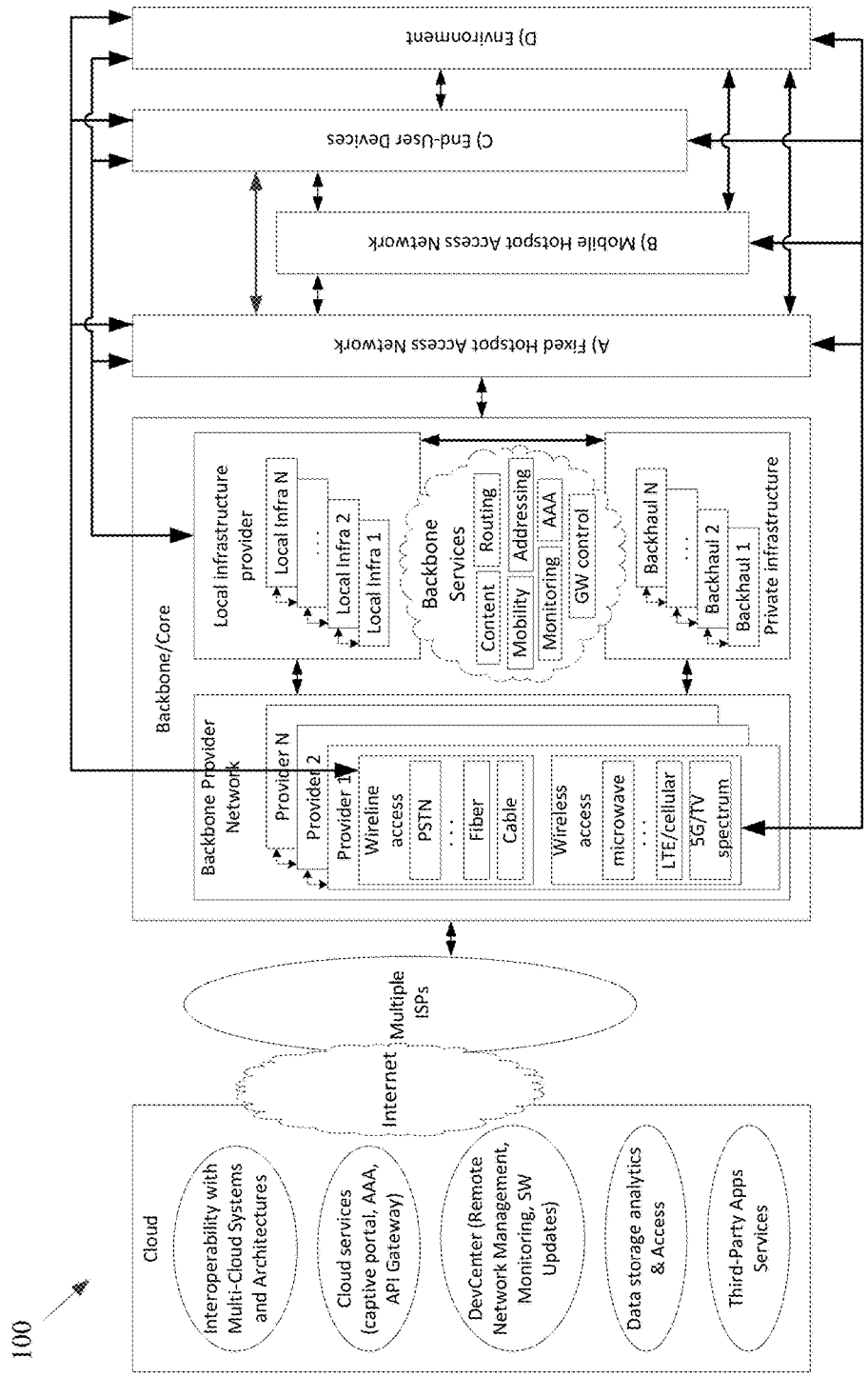
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising,"

"including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
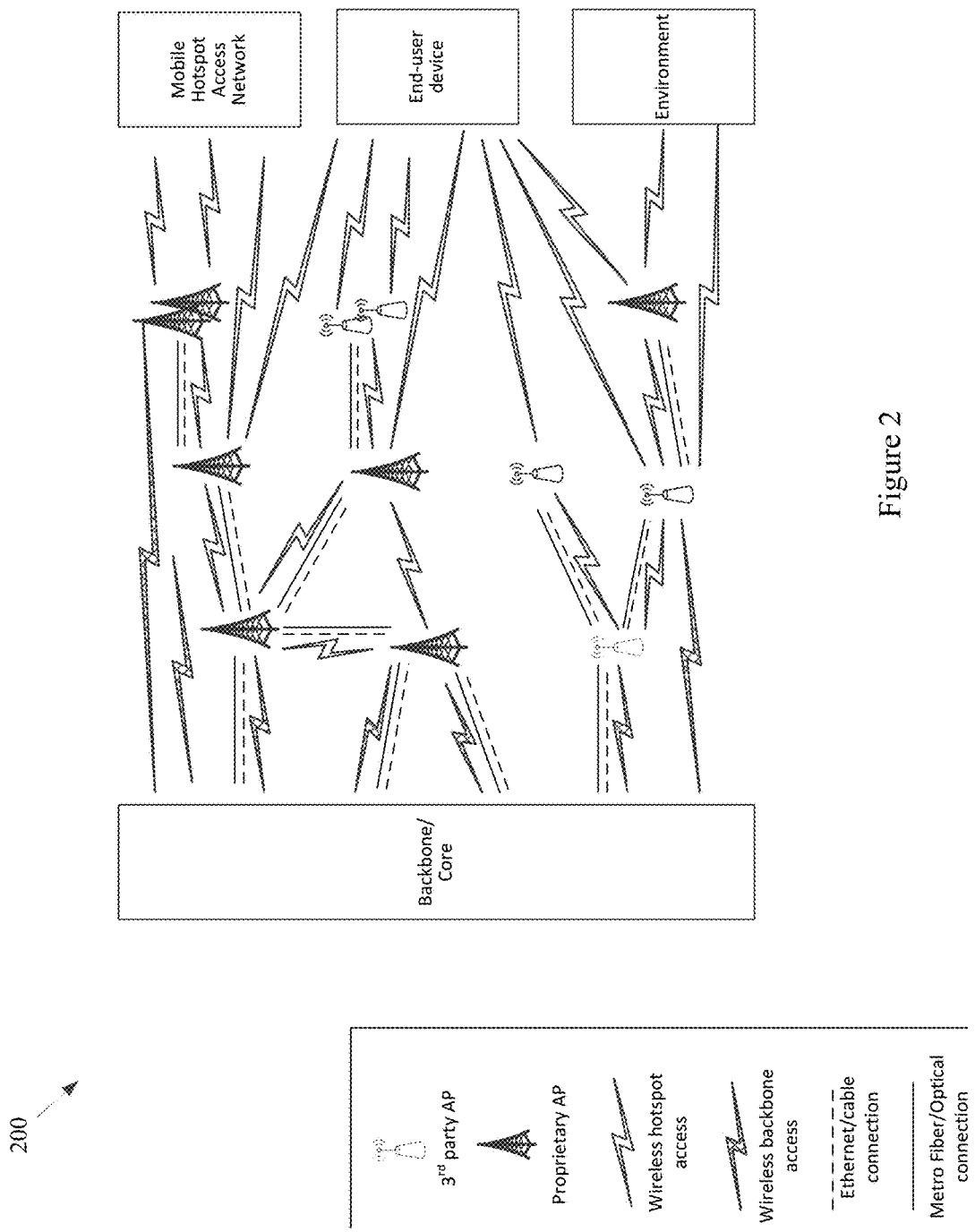
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
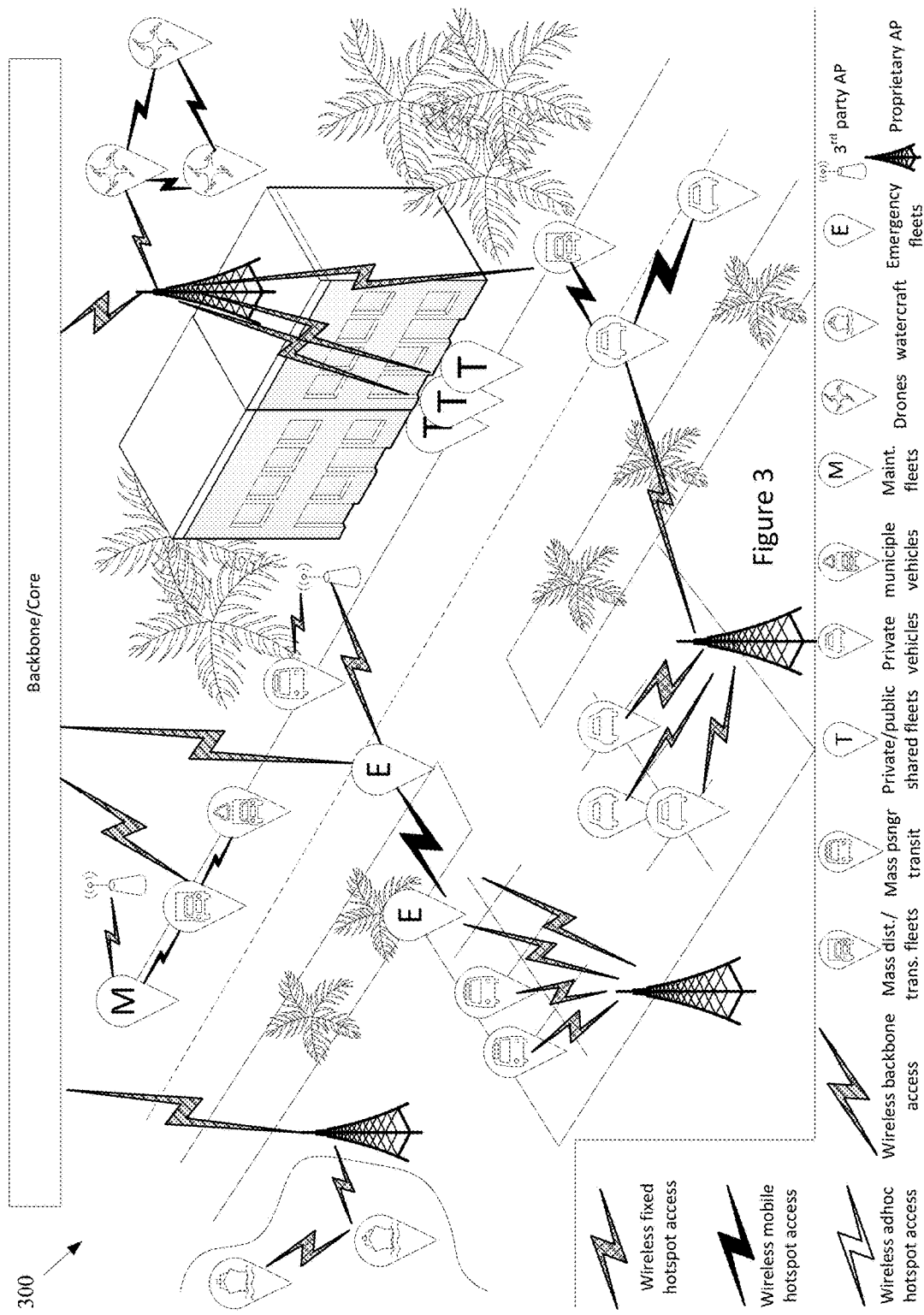
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
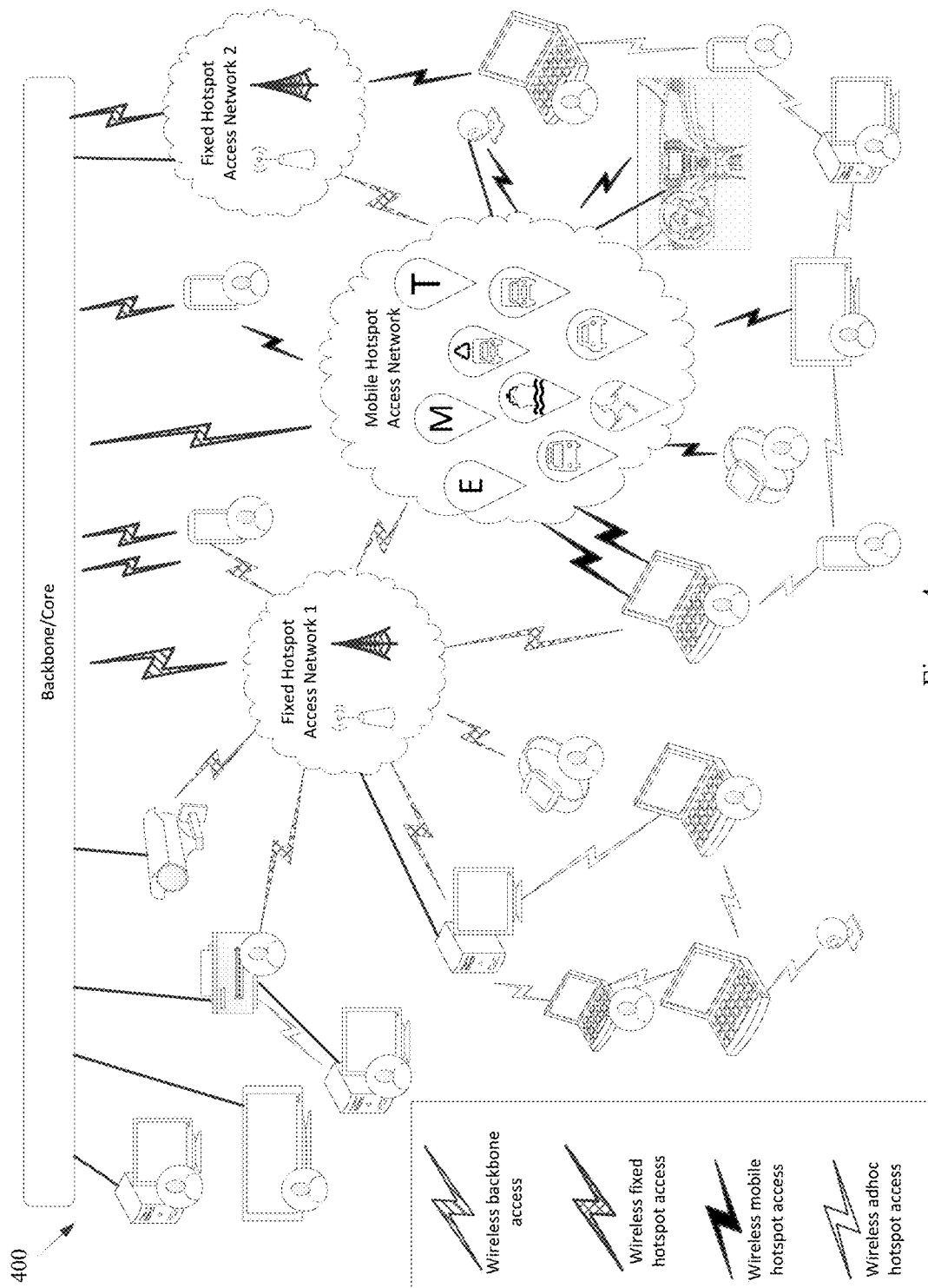
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
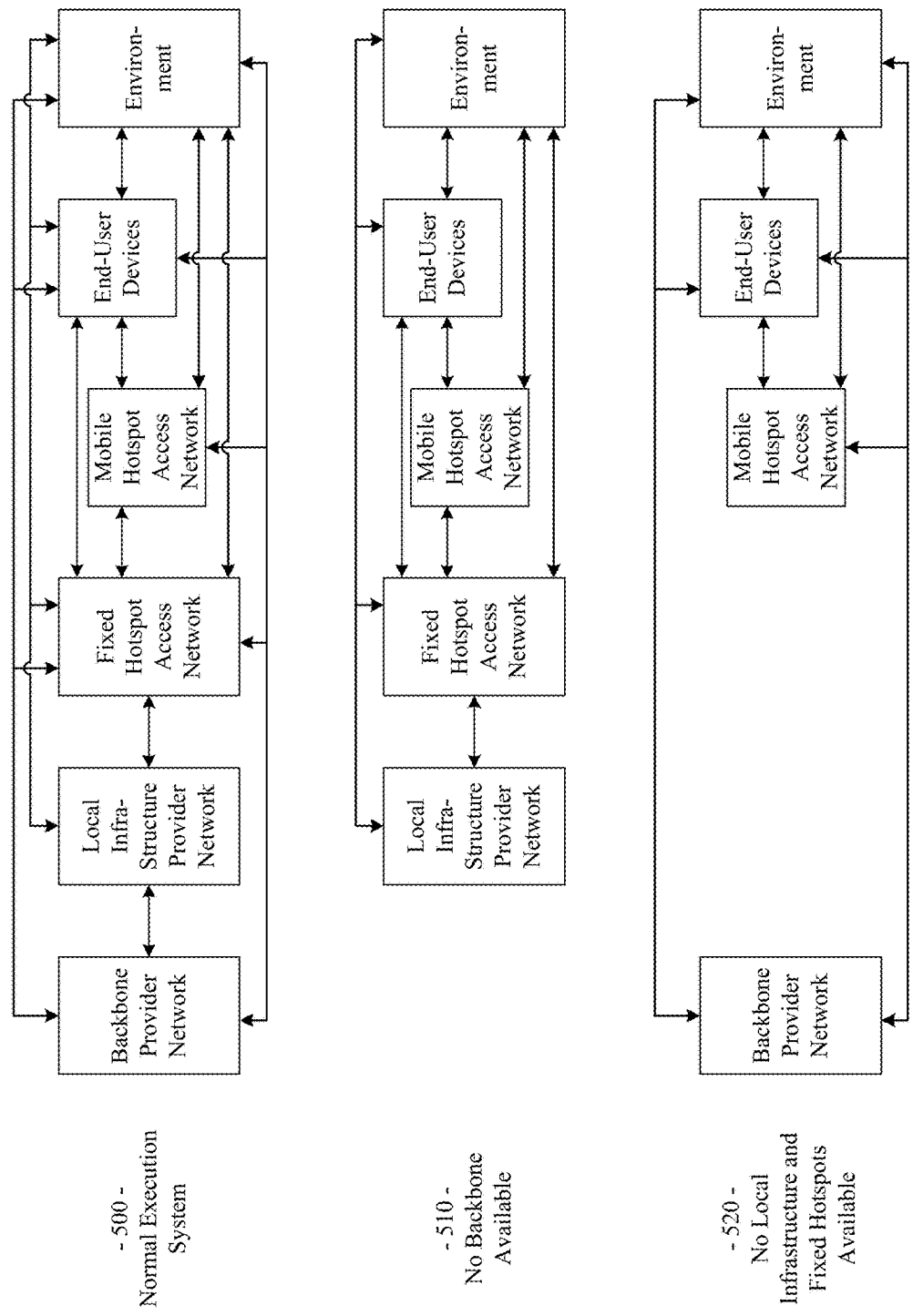
FIGS. 5A-5C show a plurality of network configurations illustrating the flexibility and/or and resiliency of a communication network, in accordance with various aspects of this disclosure.
Figure 5B:
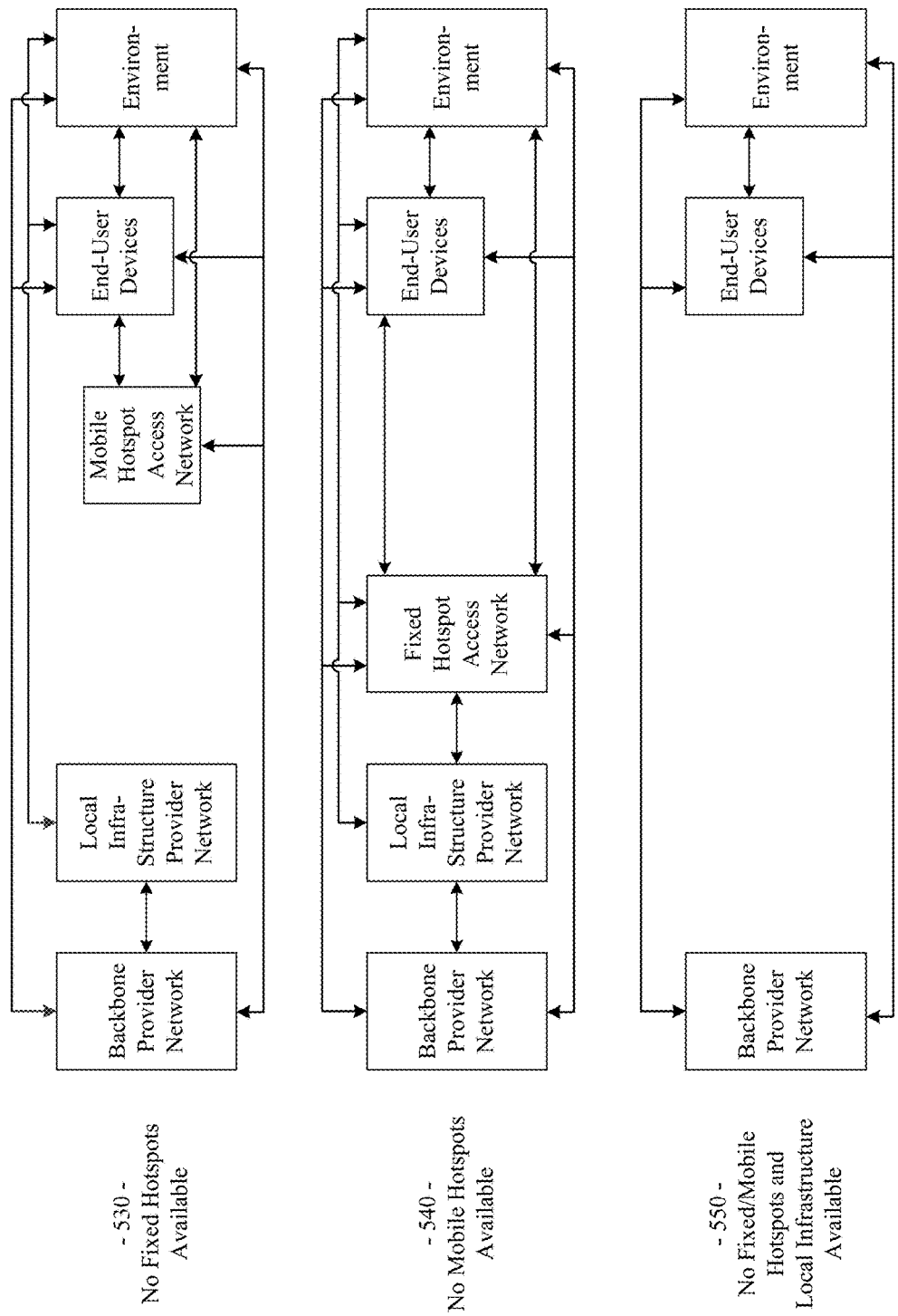
Figure 5C:
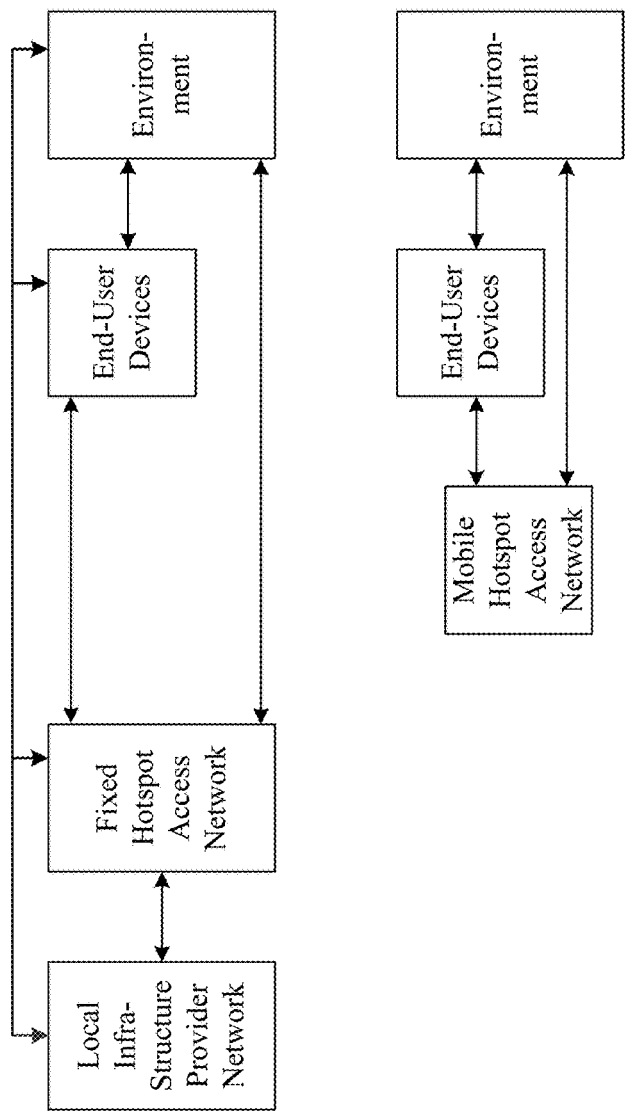

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
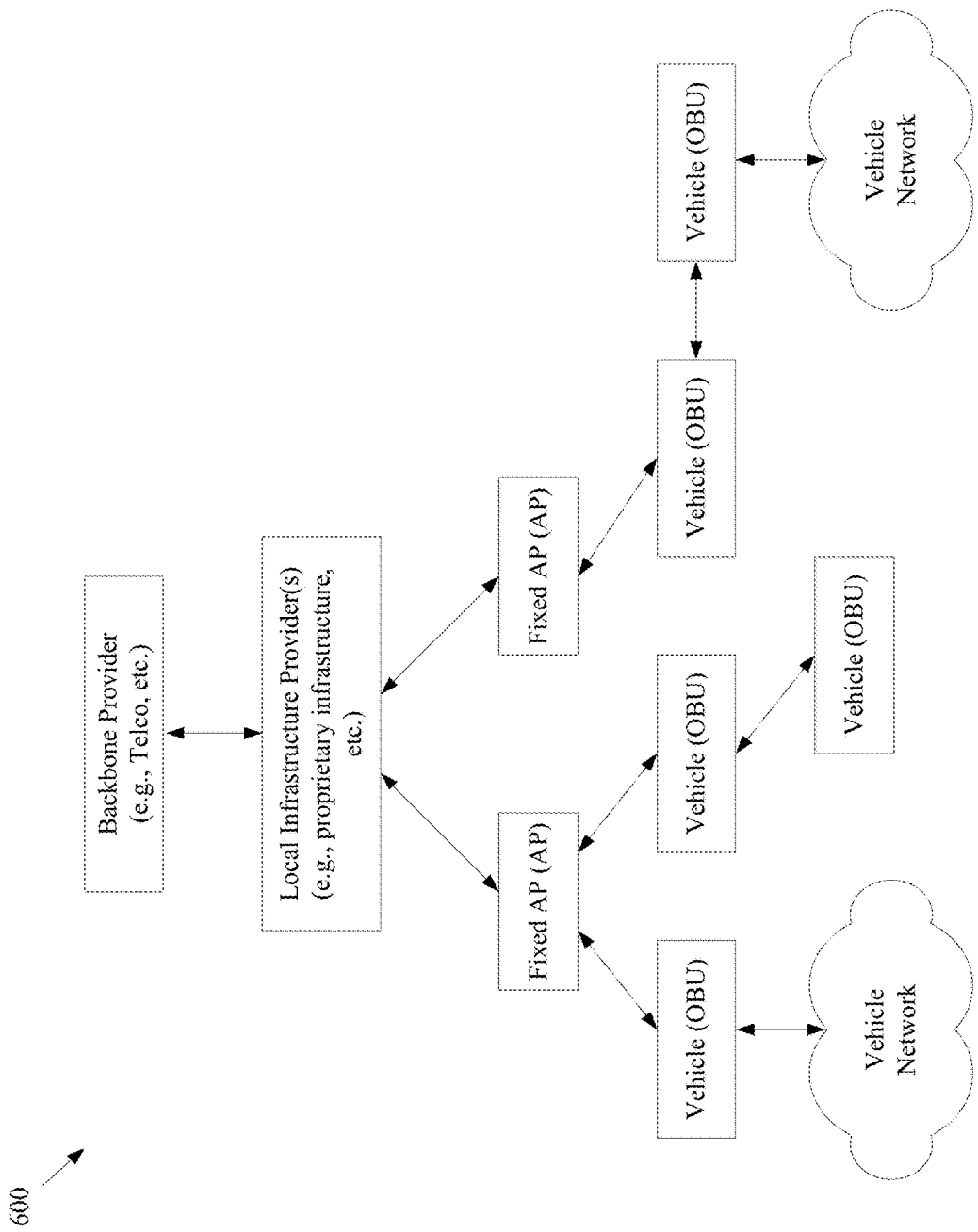
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

There is an ever growing amount of data generated throughout the huge variety of connected devices in the network of moving things. Aspects of this disclosure provide for cost-effective retention and dissemination of such data through the vehicular network infrastructure, while meeting the QoS needs of the applications/services that use such data. Such applications/services may be located in the Cloud, may be provided by network nodes (e.g., mobile or fixed access points (MAPs or FAPs), or may be run by the end-user devices connected to the APs. As used herein, "data retention and dissemination rules" may be used to govern where (i.e., in which network nodes and/or which storage devices of which network nodes), when (i.e., at what times and/or for how long), and/or how (i.e., in what format or form of organization (e.g., compressed, non-compressed, structured as "objects", unstructured files, etc.), via which type(s) of network communication link(s) (e.g., Wi-Fi (e.g., IEEE 802.11a/b/g/n/ac/ad/ad), cellular (e.g., 3G, 4G, LTE, GSM, CDMA, etc.)) data is: routed, stored, dropped, replicated, shared, prioritized, scheduled, and/or the like, in the upstream and/or downstream directions. As used herein, the term "bundle" may be used to refer to a block/package/unit of data (e.g., comprising one or more fragments of data from one or more files from one or more sources) sent between a first network node and a second network node. A bundle may comprise a single packet (e.g., an IP packet) or may be a set of such packets that belong to the same piece of data. It should be noted that while the length of a packet may, for example, be defined in terms of a Maximum Transfer Unit (MTU) number of bytes (e.g., 1500 bytes in some networks), a bundle may be made up of one or more packets, depending upon the amount of data to be transferred from the sending network node to a receiving network node. In accordance with various aspects of the present disclosure, a bundle may be split at the sending node and aggregated again at the receiving node.

The highly mobile and constantly changing nature of mobile APs can make it difficult to communicate large amounts of data to and from the mobile APs in a timely and cost-efficient manner. Accordingly, various aspects of this disclosure enable taking advantage of the intermittent contacts that may occur among mobile APs and between mobile APs and fixed APs, in order to reduce the cost of storing and transferring the data. By taking advantage of aspects of this disclosure, the data can be better balanced among mobile APs, thus reducing the amount of storage capacity required of the mobile APs, while still meeting latency/QoS requirements of the end-users of the data and reducing reliance on expensive (e.g., cellular) data connections. For example, a mobile AP that does not frequently connect to any fixed APs may be forced to resort to, for example, a cellular data connection to enable the mobile AP to reach a resource or system located in, for example, the Cloud/Internet. Aspects of the present disclosure, however, enables such mobile APs to communicatively couple to other mobile AP(s) that more-frequently connect to one or more fixed AP(s), thus enabling those APs to reach the Internet/Cloud without having to resort to a more costly (e.g., cellular) data connection.

Aspects of this disclosure provide various methods and systems that may be used to optimize (e.g., in terms of overhead such as cellular network usage, amount of network congestion introduced, number of data connections established, etc.) the flow of data between mobile APs both in the upstream and downstream directions.

In an example implementation, a sending node of a network as described herein (e.g., a mobile AP) may broadcast a bundle to be received by one or more neighboring nodes of the network (e.g., MAPs and/or FAPs within communication range of the sending MAP). Each of those neighboring nodes may then decide, based upon context information available to the respective neighboring node, whether or not to store the received bundle, and whether or not to acknowledge the receipt of the bundle to the sending node.

In accordance with aspects of the present disclosure, the sending mobile AP may decide, based on context information available to the sending MAP, whether or not to replicate a bundle to one or more of its neighboring nodes using, for example, unicast messages (addressed to a single receiver), and if so, whether or not to wait for acknowledgement of the unicast message by the neighboring node. Thus, in such an implementation, the decision/knowledge regarding how to handle the bundle is centralized at the sender.

In a network according to aspects of the present disclosure, one or more nodes of the network (e.g., devices such as mobile APs, fixed APs, Delay Tolerant Network/Disruption Tolerant Network (DTN) servers, etc.) may advertise information about one or more bundles that the one or more network nodes are currently storing (e.g., by sending unicast, multicast, and/or broadcast messages into the network). Such advertised information may include, for example, the type of data in the bundle(s), the size of the bundle(s), whether the network node is trying to send the bundle(s), the destination of the bundle(s), etc. Other network nodes receiving such advertisements may then use context information available to the other network nodes to decide whether the other network nodes want/need the bundle(s), and/or whether the other network nodes can accept receipt of the bundle(s) for subsequently forwarding to yet another network node.

In accordance with various aspects of the present disclosure, one or more nodes of the network (e.g., devices such as mobile APs, fixed APs, DTN servers, etc.) may advertise information about one or more bundle(s) that they are currently in need of or want to receive (e.g., by sending unicast, multicast, and/or broadcast messages into the network). Other network nodes receiving such advertisements may then use context information available to the other nodes to decide whether they are in possession of the wanted/desired bundle(s), and, if so, whether the other nodes can and/or should agree to deliver the bundles to the node advertising the need/want.

In a network according to aspects of the present disclosure, network nodes (e.g., mobile APs or other devices) may establish what may be referred to herein as a "control channel" with one or more fixed APs and/or the Cloud, in order to gather context information that may be used in selecting and implementing data dissemination and retention rules.

In a network as described herein, for communication in the "upstream" direction (i.e., in which the Internet/Cloud is the end destination), many or all of the nodes of the network may attempt to send data to the same destination (e.g., DTN server), whereas communication in the "downstream" direction (i.e., from the Internet/Cloud to the APs) may involve the use of "flooding" mechanisms to distribute data to the nodes of the network. Accordingly, in such a network, a first set of one or more data dissemination and retention rules may be used for the "upstream" communication, and a second, possibly different, set of one or more data dissemination and retention rules may be used for "downstream" communications. Such data dissemination and retention rules may be a part of configuration information distributed to the nodes of a network according to the present disclosure. Additional information about the distribution of such configuration information may be found, for example, in U.S. patent application Ser. No. 15/138,370, titled "Systems and Methods for Remote Configuration Update and Distribution in a Network of Moving Things," filed Apr. 26, 2016, the complete subject matter of which is hereby incorporated herein, in its entirety.

In a network according to various aspects of the present disclosure, the context information used by a particular network node at any particular time may comprise, by way of example and not limitation, characteristics of the particular node (e.g., the network or geographic location, speed, direction, path of travel, uptime, hardware configuration, software configuration, and/or the like); characteristics of data to be sent or received by the particular node (e.g., the size, QoS requirements, and/or the like); and/or characteristics of any wireless link(s) available for communicating the data (e.g., maximum available bandwidth, currently available bandwidth, amount of congestion, error rate, etc.). The context information used by the particular network node may also comprise, for example, characteristics of neighbor device(s) such as, for example, the speed, direction, and/or path of travel of each neighbor; the type and/or amount of data storage available on each neighbor; an operator of each neighbor; and/or the like, where the neighbor(s) may comprise one or more mobile APs, fixed APs, cellular base stations, and/or end-user devices. In addition, the context information used by the particular network node may comprise, by way of example and not limitation, characteristics of the environment of the particular network node such as, for example, a number/density of nodes present within a determined region or area surrounding the network node; an amount of wireless interference or activity present in an area around the network node; the presence/size/location/etc. of physical obstructions that may affect the particular network node (e.g., whether line-of-sight vs. non-line-of-sight communication is possible); and/or an expected time until being in-range of a fixed AP, and/or the like).

In accordance with various aspects of the present disclosure, such context information may be provided by, for example, devices in the Internet/Cloud, mobile APs of the vehicular network, fixed APs of the vehicular network, sensors of the vehicular network, and/or end-user devices of the vehicular network. For example, one or more of these network nodes and/or devices may probe the network and may provide context information in real time.

As a few, non-limiting examples, context information used by a particular node for a particular bundle may comprise the number of replicas of the particular bundle that currently exist in the network; a probability that the particular node can wirelessly communicate with a particular neighbor node (e.g., without using a cellular connection); a probability that the particular node can communicate with any neighbor node; and/or a probability that the particular node will be at or in proximity to a particular geographic location within some determined time interval (e.g., for nodes that are mobile). Context information used by the particular node for a particular bundle may also comprise, for example, a probability that the particular node will be able to wirelessly connect to a fixed AP (e.g., based on its current geographic location, historical information of the geographic location of the particular node, and/or the geographic location(s) of one or more fixed APs of the network). In addition, context information used by the particular node for a particular bundle may also comprise, for example amount of unused storage in the particular node; an amount of unused storage in one or more neighboring nodes; a number of missing fragments of a specific file that are needed in order to decode the entire file; a "time-to-live" for the particular bundle; a latency tolerance of the particular bundle; a number of hops the bundle has traversed and/or should traverse; and/or a past, present, and/or predicted future number of nodes that have been/are/will be neighbor nodes of the particular node. The term "time-to-live" may be used herein to refer to a maximum amount of time that a bundle is allowed to be in transit within the network before an action is taken to delete the bundle from each node of the network. In accordance with various aspects of the present disclosure, a bundle may, for example, contain a "date/time of creation" (e.g., 15:30 02/02/17 UTC) and a "time-to-live" (e.g., 3600 seconds or 60 minutes). In an alternate instance according to the present disclosure, each bundle may, for example, contain a "date-to-live" or "expiration date" (e.g., 16:30 02/02/17 UTC), which may define a date/time when the bundle is no longer valid. Using such information, a network node (e.g., a mobile AP, fixed AP, NC, sensor, etc.) may calculate, using current date/time information from, for example, a GNSS/GPS receiver or a Network Time Protocol (NTP) server, whether the bundle is valid. In accordance with aspects of the present disclosure, a "time-to-live" or "date-to-live" may provide for a bundle life of, for example, up to 60 seconds, up to an hour, or as much as a day.

Various aspects of this disclosure enable prioritizing and/or scheduling communication and/or delivery of a bundle based on a "time-to-live" of the bundle, an indication of priority and/or importance of the bundle, an indication of latency sensitivity of the bundle, and/or other characteristics of the bundle. A network in accordance with aspects of the present disclosure includes methods and systems for scheduling bundles carrying real-time data that is to be communicated with highest priority.

Various aspects of the present disclosure provide methods and systems for dealing with a variety of characteristics of different types of storage systems which may be in use at the nodes (e.g., FAPs, MAPs, NCs, sensor(s)) of the network. By way of example and not limitation, the context information may include storage capacity, read/write speed, organization, etc. of storage devices and file systems from which the data will be read and/or to which the data will be stored. For example, some storage systems of a network node may comprise hard disk drives, and some may comprise solid state devices (e.g., FLASH-based or battery backed RAM). Some storage in network nodes may, for example, be organized as file-based storage, some may be organized as object-based storage, and some may use other types of organization/structure.

In accordance with various aspects of the present disclosure, data compression may be applied to a particular bundle at a particular time, and the algorithms for such data compression may be determined based on context information. For example, the data compression algorithm employed, the target compression ratio, and other aspects, may be determined based on the type of data contained in the bundle. By way of example and not limitation, the data contained in a bundle may be characterized by metadata such as a file extension that associates the data with a particular software application, by latency sensitivity of the bundle, by a "time-to-live" of the bundle, by a type of network connection over which the bundle is to be communicated, to name only a few characteristics that are contemplated.

In a network according to aspects of the present disclosure, context information may be used to determine which bundles a network node (e.g., FAPs, MAPs, NCs, etc.) is to drop/delete/overwrite in order to maintain a sufficient quality of service (QoS). Whether a particular network node stores or drops a particular bundle may depend upon, by way of example and not limitation, one or more indicators of the urgency, delay-sensitivity, loss-tolerance, and/or "time-to-live" of the bundle; an amount of bandwidth available on communication links to/from the network node currently handling the bundle, and/or an amount or type of storage available in the node handling the bundle. In addition, if a decision is made to store the particular bundle at the particular node (e.g., based on any of the context information discussed herein), the duration of time for which the particular bundle should be stored at the particular node may be determined based on any of the context information described herein.

A node of a network according to aspects of the present disclosure (e.g., a fixed AP, mobile AP, network controller) may, for example, be configured to predict the impact of various possible data dissemination and retention rules, to assess which rule(s) will be the best, or at least a suitable choice. Such a prediction may be based, for example, on context information advertised by the Cloud, by fixed APs, by mobile APs, by sensors, and/or by end-user devices. In accordance with some aspects of the disclosure, such predictions may be based on context information collected and/or derived from previous surveys and/or analyses performed in a network context similar to the context that a mobile AP is currently experiencing, or may be predicted to experience in the near term. Some example characteristics used in making such predictions may include, by way of example and not limitation, a network or geographic location, a measure of density of mobile APs, a measure of density of fixed APs, obstructions that may impact wireless communication, requirements set by the end-users of the data being communicated, to name just a few.

Methods and systems in accordance with aspects of this disclosure may use hysteresis and/or other techniques to reduce frequency of switching between different data retention and dissemination rules, so as to avoid oscillations that may occur between different rules, and to reduce any computational and/or resource costs of managing the data dissemination and retention rules. For example, switching to a different data retention and dissemination rule may involve arriving at a consensus of a defined set of nodes (e.g., one or more nodes in the same geographic region or same cluster).

Aspects of this disclosure enable gathering data from multiple and heterogeneous sources in a network of moving things, while taking into account the limited resources (e.g., CPU computing capacity, data storage capacity and types, operating power, etc.) of many of the nodes that are part of the network, to ensure that software applications that use the gathered data receive it in accordance with their QoS expectations. Aspects of this disclosure provide a network that is scalable, reliable, and that provides high-performance support for the gathering, transportation, dissemination, and sharing of information among different network elements, while ensuring selection of suitable trade-offs between the various requirements of all the software applications and services that make use of such data.

In a network as described herein, data storage/retention and dissemination rules may comprise various parameters which may be dynamically configured/adapted. Changing one or more such parameter values is referred to herein as changing the data storage/retention and dissemination rule or switching between different data storage and dissemination rules. As previously noted, a network in accordance with aspects of the present disclosure may have multiple sets of data storage/retention and dissemination rules for communication of data traffic in "upstream" and "downstream" directions. Some examples of such parameters include, but are not limited to, a maximum number of replicas (i.e., copies) that should be generated for a bundle at a network node, a maximum number of hops (i.e., communication paths or links) onto which to replicate a particular bundle, priorities of various data types, priorities of various senders of bundles, priorities of various recipients of bundles, whether or not a recipient of a bundle is to send an acknowledgement (ACK) of receipt of the bundle, and whether a node is to use broadcast, multicast, and/or unicast in communicating a bundle.

Figure 7:
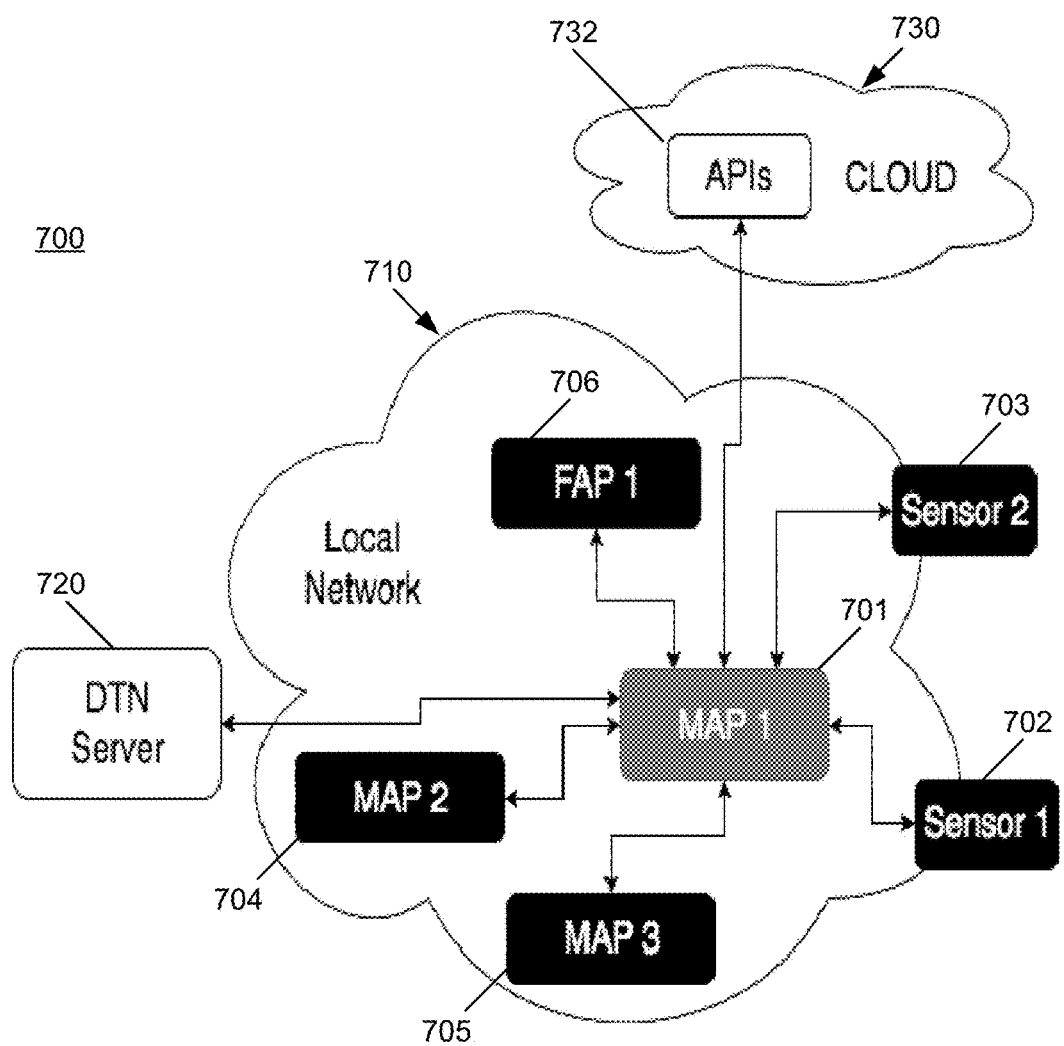
FIG. 7 shows a block diagram of an example mobile AP in a network of moving things, in accordance with various aspects of the present disclosure.

FIG. 7 shows a block diagram of an example mobile AP 701 in a network of moving things 710, in accordance with various aspects of the present disclosure. In the example shown in FIG. 7, the mobile AP MAP 1 701 is configured to communicate with a delay tolerant networking (DTN) server 720 and a set of application programming interfaces 732 of a Cloud 730, to implement data retention and dissemination rules as described herein. Functionality (e.g., circuitry, logic, and/or executable instructions) supporting delay tolerant networking in accordance with this disclosure may, for example, be integrated into one or more APs (e.g., mobile APs and/or fixed APs) or other nodes of the network 710 including, for example, one or more Cloud-based servers (e.g., the DTN server 720 shown in FIG. 7). The MAP 1 701 of the network 710 is also communicatively coupled to a sensor 1 702 and sensor 2 703, a fixed AP FAP 1 706, and mobile APs MAP 2 704 and MAP 3 705. In the example arrangement of FIG. 7, the functionality of the DTN server 720, the mobile APs MAP 1 701, MAP 2 704, and MAP 3 705; and the fixed AP FAP 1 706 manage and implement data storage and dissemination rules for the upstream transfer (i.e., "uploading") of data from the APs (e.g., the FAP 1 706, MAP 1 701, MAP 2 704, and MAP 3 705) to the DTN server 720, and for the "downstream" transfer (i.e., "downloading" or distribution) of data from the DTN server 720 to the APs (e.g., the FAPs and MAPS). For example, in accordance with various aspects of the present disclosure, the DTN functionality of the mobile AP MAP 1 701 of FIG. 7 may, for example, be fed with context information from the current neighbors of the mobile AP MAP 1 701 (i.e., FAP 1 706, MAP 2 704, MAP 3, Sensor 1 702, and Sensor 2 703), and with context information from the Cloud and the DTN server 720.

Figure 8:
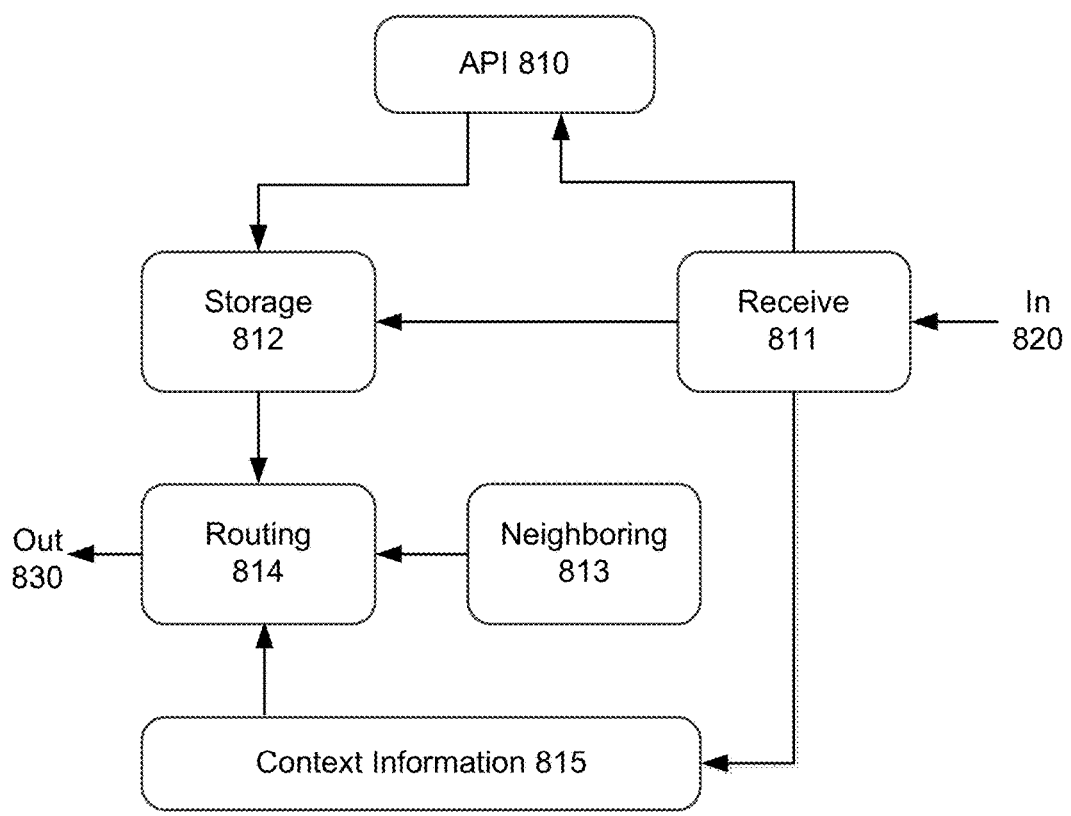
FIG. 8 shows a block diagram of example delay tolerant networking functionality for implementing data retention and dissemination rules of nodes of a network of moving things, in accordance with various aspects of the present disclosure.

FIG. 8 shows a block diagram of example delay tolerant networking functionality 800 for implementing data retention and dissemination rules of nodes of a network of moving things, in accordance with various aspects of the present disclosure. The DTN functionality 800 illustrated in FIG. 8 comprises an API functional block 810, a receive functional block 811, a storage functional block 812, a neighboring functional block 813, a routing functional block 814, and a context information functional block 815. It should be noted that the functionality of the various blocks of FIG. 8 may be realized in hardware/circuitry, executable instructions/software code, logic, and/or any combination of the above.

The neighboring functional block 813 of FIG. 8 is configured to maintain an updated list of all neighbor nodes of the network node containing the functionality of FIG. 8. Such a list of neighbor nodes may contain data items/entries for each neighbor node, where the data items/entries for each neighbor node may include any of the context information discussed above with respect to neighbor nodes. For example, such a list entry for a neighbor node may include, by way of example and not limitation, the type of the neighbor node (e.g., FAP, MAP, Sensor, NC, etc.); the geographic location of the neighbor node (e.g., latitude/longitude); the speed, direction, and/or a path of travel of the neighbor node (i.e., for neighbor nodes that are MAPs); as well as other context information such as a received signal strength indication (RSSI) for the neighbor node. The neighboring functional block 813 may interact with, for example, an operating system of the node in which the functionality of FIG. 8 resides, to obtain information about the available neighbors of the node, such as mobile and fixed APs, Wi-Fi neighbors, or neighbors in other technology (e.g., Bluetooth, DSRC, etc.).

The receive functional block 811 is configured to receive and process incoming bundles (i.e., via In 820) from other nodes of the network. The receive functional block 811 may interact with the storage functional block 812 to store received bundles and characteristics about the stored bundles, and to access characteristics about the stored bundles. Such characteristics may include those described herein such as, for example, the size of the bundle, metadata such as a file extension that associates the data of the bundle with a particular software application, a type of data of the bundle, a latency sensitivity of the bundle, a "time-to-live" of the bundle, and a type of network connection over which the bundle is to be communicated, to name just a few characteristics. Such stored characteristics may be accessed for the purpose of creating acknowledgements (ACKs) and/or other messages (e.g., a response indicating that the data of the bundle was previously received, a response indicating that the storage for bundles at the node is full, etc.), regarding the received and/or stored bundles. The receive functional block 811 may, for example, implement data retention rules that are used to determine which received bundles are to be stored in the storage functional block 812.

The routing functional block 814 is configured to generate and send messages to other nodes of the network. The routing functional block 814 may, for example, interact with neighbors of a network node (e.g., nodes within wireless communication range of the node in which the routing functional block 814 resides), to acquire and maintain updated information about the current neighbors of the node, and may interact with the storage functional block 812, to "peek" a bundle. The term "peek a bundle" may be used herein to refer to an action by a network node (e.g., a fixed or mobile AP, NC, sensor, etc.) to, for example, get access to or a copy of a bundle, or access to or a copy of the headers of a bundle (e.g., from storage), to enable the network node to determine using the information in the bundle, when, where, and to whom to send the bundle. The routing functional block 814 may be configured to implement data dissemination rules used to determine, by way of example and not limitation, which received bundles are to be sent, which node(s) are to receive the bundles that are sent, the communication link(s) (e.g., Wi-Fi, DSRC, Bluetooth, cellular) to be used for sending the bundles, the settings to be used on the communication link(s) (e.g., the data rate, the modulation scheme, any time-out values, maximum number of retries, etc.) to be used when sending the bundles, etc. The routing functional block 814 of a node may, for example, operate to define data storage and dissemination rules related to one or more conditions in which bundles are dropped by the node, and how prioritization and scheduling of the transmission of bundles is done by the node. Such rules may, for example, provide for multiple classes of service in regards to bundle delivery delay and loss tolerance.

The storage functional block 812 is configured to maintain a data structure having records/entries for all bundles received by the node (e.g., organized in different lists, organized by a type of storage device used to store the bundle (e.g., a memory card (e.g., SD/SDHC/SDXC, CF, etc.), system FLASH memory, battery-backed RAM, and/or other forms of data storage). The storage functional block 812 may interact with the receive functional block 811 and the routing functional block 814, to provide access to, to retrieve, and/or to store data, as well as other functions that may be used to collect/generate context information.

The context information functional block 815 is configured to collect information from the neighbors of a node, from a remote server (e.g., the DTN server 720 of FIG. 7), and from the Cloud. The routing functional block 814 and the receive functional block 811 may then use the context information to configure and implement data storage and dissemination rules.

The application programming interface (API) functional block 810 of a network node is configured to parse instructions, referred to herein as "API calls," that are received by the node via the receive functional block 811. The API functional block 810 may then validate and/or authenticate the received API calls, and may then perform or cause the performance of operations requested by valid and/or authenticated API calls. Such API calls may include, for example, an API call to store data to the storage functional block 812, and an API call to fetch data from the storage functional block 812 for transmission via the routing functional block 814.

In an example implementation in accordance with various aspects of the present disclosure, control communications among network nodes (e.g., mobile APs, fixed APs, and a DTN server) may use a short "common header" for all types of messages, and may use a "type-specific header" that follows the "common header." Such type-specific headers may include, for example, what may be referred to herein as a "bundle header" (e.g., a header specifically used for messages carrying data being disseminated), what may be referred to herein as an "ACK header" for use in an acknowledgment message, and other type-specific headers for various "control messages."

The term "control message" may be used herein to refer to any type of packet used to communicate information/context between/among two or more network entities including, for example, one or more MAPs, FAPs, DTN server(s), sensor(s), and/or the Cloud. A control message may be a "request control message" that may be used, for example, to request any type of information from one or more other node(s), or a "response control message" that may be used to provide a response to a request from another node. For example, a "response control message" may be used to provide context information about status of particular bundles, about the probability of being within range of wireless communication (e.g., "contact") with a particular network node, and/or about the presence of new bundles in a network in accordance with various aspects of a network of moving things as described herein.

In a network in accordance with aspects of the present disclosure, an "ACK message", as well "response control messages" or any type of "control message" may include space for one or more "flags." Such flags may be used by a receiving node to provide additional information about the status of delivery of a control message, as well as the status of the responding neighbor, to the sending node. Examples of such status information include, but are not limited to, whether storage at the neighbor is full, whether the neighbor is experiencing any sort of technical problem(s), whether the neighbor accepts custody of the data just sent to the neighbor, whether the neighbor received and stored the data just received, whether a sufficient number of data fragments are available to enable reconstruction of the file of which the data is a part, and whether the data sent to the neighbor was already stored at the neighbor.

In an example implementation according to aspects of the present disclosure, the neighboring functional block 813 may provide context information including, for example, updates on the state of neighboring nodes. Such context information may be real-time context information, in that such information may reflect the state of a neighbor node within a short period of delay (e.g., within millisecond, tens of milliseconds, or a few hundred milliseconds of existence of the state at the neighbor node). In accordance with aspects of the present disclosure, changes in a list of neighbors maintained by any given network node (e.g., located in an operating system Kernel of the node) may be announced to the DTN. Such an announcement of changes may be sent to any network node that belongs to the DTN including, for example, neighbor nodes, neighbors of neighbor nodes, and a DTN server. In accordance with aspects of the present disclosure, the neighboring functional block 813 of any network node may pre-filter the list of neighbors that the node maintains. The pre-filtering may be performed before the list of neighbors of the node is announced to the DTN. Such pre-filtering may, for example, be based on context information maintained by the node including, by way of example and not limitation, RSSI measurements of wireless signal(s) from the neighbor node(s), an average time between reboots of the neighbor node(s), an indication of one or more technical (e.g., electrical, software, etc.) problem(s) at the neighbor node(s), and/or other information that is a factor in assessing the reliability or stability of the neighbor node(s). Such pre-filtering may produce a list of the "best" or "healthiest" neighbors, which may identify those neighbors that may be relied upon to operate predictably and reliably. In this manner, the routing functional block 814 of a node may then use the filtered list of neighbor nodes in configuring and implementing data storage/retention and dissemination rules. In accordance with various aspects of the present disclosure, one or more thresholds for one or more parameter values used in the pre-filtering process (e.g., a minimum RSSI for a node to be considered as providing a usable wireless communication link) may be adjusted dynamically, based on a variety of factors including, for example, feedback from previous communication with neighbor nodes, the size of a particular bundle to be transmitted to a neighbor node, and/or the like.

In accordance with aspects of the present disclosure, data storage/retention and dissemination rules for downstream data may determine, by way of example and not limitation, whether a bundle is sent as unicast, multicast, or broadcast traffic; whether a recipient of the bundle is to send an ACK; and/or whether an end-to-end ACKs for a bundle is to be sent to and/or from a DTN server (e.g., DTN server 720). Such data storage/retention and dissemination rules for downstream data may also determine, for example, how many replicas/copies of a particular bundle should be sent by a particular sender or a particular type of sender (e.g., the sender originating the bundle and communicating the bundle to an intermediate node, an intermediate node communicating the bundle to another intermediate node, a sender communicating the bundle to a DTN server, and/or other types). Data storage/retention and dissemination rules for downstream data of a network, in accordance with aspects of the present disclosure, may determine, by way of example and not limitation, whether to use fixed access points as anchors (i.e., whether a mobile AP should only send or receive a bundle that originated at a fixed AP, when in range of a fixed AP). Such data storage/retention and dissemination rules for downstream data may also determine, by way of example and not limitation, whether to request control information from fixed APs and/or the Cloud, to help the download of a particular file (e.g., information about how many more fragments are needed to be able to decode the particular file, how many fragments of a particular file have been received so far, and/or the like); and/or whether a device, or a bundle is currently on, or should be added to, a "blacklist." The term "device" may be used in this context to refer to, for example, a network node (e.g., a fixed or mobile AP, NC), an end-user device (e.g., a cellphone; smart phone; tablet, laptop, or other type of computer), or a sensor, if such a device is part of a DTN. In accordance with aspects of the present disclosure, a "blacklisted" device or node may not be used to send bundles, and may be avoided by other network nodes, etc., since the device or node may be "blacklisted" for many reasons including, for example, poor network performance, full/limited storage capacity, and/or security issues, to name only a few reasons.

Figure 9:
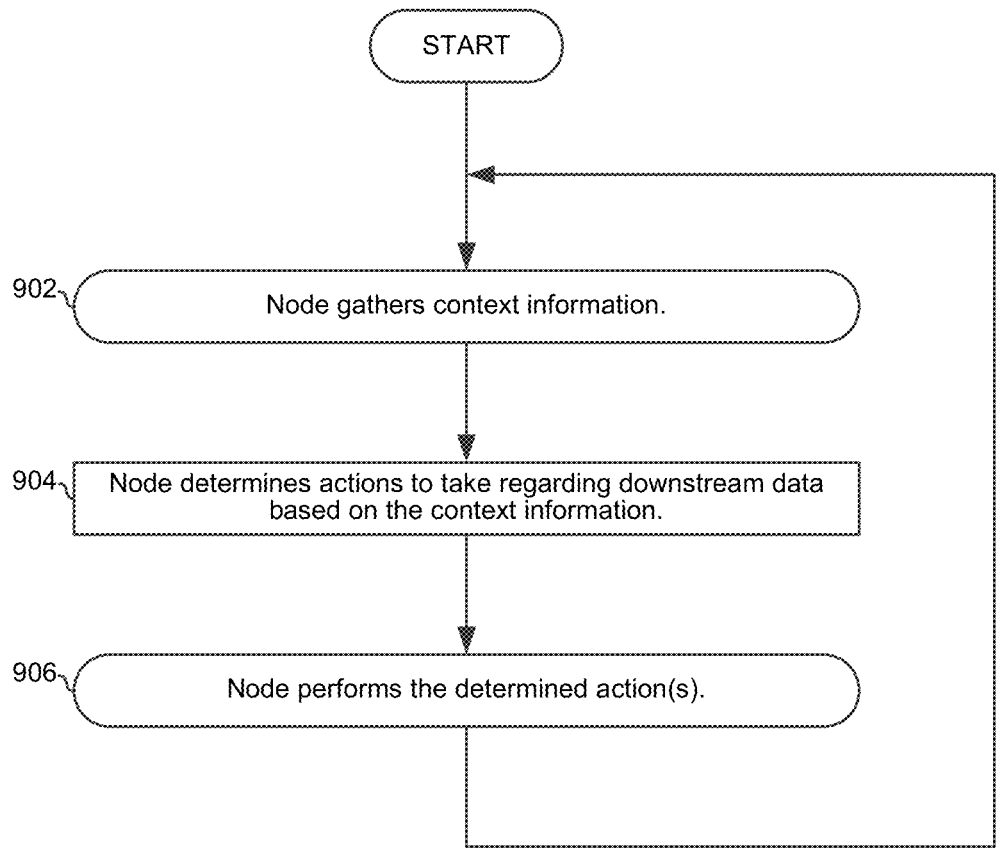
FIG. 9 is a high-level flowchart illustrating an example process for retention/storage and dissemination of a downstream bundle, in accordance with various aspects of the present disclosure.

FIG. 9 is a high-level flowchart illustrating an example process for retention/storage and dissemination of a downstream bundle, in accordance with various aspects of the present disclosure. In block 902, a network node (e.g., a mobile AP) may gather context information. Additional information about the nature of such context information is provided hereinabove. In accordance with various aspects of the present disclosure, the network node referred to in FIG. 9 may be, for example, a mobile AP, a fixed AP, or an end-user device. In block 904, the network node may determine which action(s) to take with respect to bundles destined for network nodes that are downstream, based on the context information available to the network node. At block 906, the network node may perform the action(s) determined at block 904.

With further regard to block 904 of FIG. 9, the method may comprise, for example, using data storage and dissemination rules for downstream data (i.e., digital information destined for nodes at the edge of the network (e.g., mobile APs)), to determine, based on context information, whether a mobile AP should wait for specific data from the DTN server, and/or to determine whether a mobile AP should request specific data from the DTN server.

Block 904 of FIG. 9 may comprise, for example, determining whether a mobile AP should wait for specific data from another mobile AP, determining whether a mobile AP should request specific data from another mobile AP, and/or determining if and when to send particular bundles.

The method of FIG. 9, at block 904, may comprise, for example, determining whether and when to send broadcast transmissions, determining whether and when to send multicast transmissions, determining whether and when to send unicast transmissions, and/or determining how many replicas/copies to send of particular bundles.

In addition, block 904 of FIG. 9 may comprise, for example, determining whether to use fixed APs as anchors for data distribution. At block 904, the method of FIG. 9 may comprise, for example, determining which control information (e.g., information about a number of bundles needed to decode an entire file, about which bundles have been sent, about which bundles have been received, etc.) a mobile AP is to request from other mobile APs, from fixed APs, and/or from the Cloud. The discussion that follows provides additional details regarding the decisions and actions that may be taken by a network node as a result of the determinations of block 904 of FIG. 9.

In accordance with various aspects of the present disclosure, one or more files and/or bundles to be disseminated to the network may, for example, be queued in a network node such as a DTN server (e.g., the DTN server 720 of FIG. 7), and such queued files and/or bundles may be occasionally or periodically broadcast from the network node DTN server to other nodes of the network via one or more fixed APs of the network (e.g., one or more of the fixed APs of FIGS. 1-6). Such dissemination may occur, for example, during an interval/period of time when a network node (e.g., a mobile AP) is within wireless communication range of a fixed AP (e.g., using IEEE 802.11p or other suitable wireless communication technology), and the mobile AP may ask the DTN server (e.g., via a fixed AP) to send one or more files (e.g., each comprising one or more bundles) into the network. In accordance with aspects of the present disclosure, any mobile APs wirelessly connected to any of the fixed APs of the network during that time interval may thus receive the bundle(s) that are broadcast from the DTN server, and therefore parts or the entirety of any files carried by such bundles. For files that already exist (at least in part) in the nodes of the network, this approach may have a potential drawback in that mobile APs may receive bundles (containing file portions) that they already have in storage. For new files, however, there is a high probability that most network nodes (e.g., mobile APs) receiving the broadcast do not already have the file in storage. The term "new" may be used herein to refer to how much time has passed since a file or bundle was introduced to the network of the present disclosure such as, for example, a file or bundle that has been delivered to or loaded onto a DTN server (e.g., DTN server 720 of FIG. 7) for delivery/dissemination by the network. The "age" of a file or bundle, i.e., how "new" or "old" a particular file/bundle is considered to be, may be determined using, for example, a date or a date and time at which the file or bundle was introduced to the network for delivery/dissemination or loaded onto a DTN server of the present disclosure. In accordance with some aspects of the disclosure, the "time-to-live" parameter of a file/bundle may also be used as an indicator of age or how "new" or "old" a file or bundle is. Thus, this approach may be selected when it is desired to quickly disseminate new files or bundles throughout the network.

In accordance with various aspects of the present disclosure, a DTN server may be operable to intelligently control, based on context information available to the DTN server, which data is broadcast into the network. In some instances, the DTN server may, for example, autonomously decide to broadcast all bundles containing content of a particular file. With this approach, relatively smaller files may be able to be communicated to a first network node such as a first mobile AP during the period of time that the first mobile AP is within communication range of, for example, a fixed AP and/or a second mobile AP used to download the file to the first mobile AP. However, relatively larger files correspond to a greater likelihood that the first mobile AP will not be within wireless communication range of a fixed AP or a second mobile AP for a period of time long enough for the first mobile AP to receive all bundles of the file of interest, and the first mobile AP may, in fact, fail to receive the particular bundles that the first mobile AP needs. Therefore, data dissemination rules according to aspects of the present disclosure may, for example, dictate that the DTN server broadcast all content (e.g., all bundles) of a particular file only when the size of the entire file is below a particular threshold size so that there is at least a certain threshold probability that the entire file is able to be communicated to a particular mobile AP. Such a threshold size of a file being considered for transfer/download to a network node may be determined using a calculation or via table lookup, based on context information for the receiving network node(s) (e.g., the velocity or speed of the mobile AP(s) that would be the recipient(s) of the file content).

In accordance with various aspects of the present disclosure, network nodes such as, for example, mobile APs may request specific files and/or specific bundles of specific files from the DTN when connected to a fixed AP. In a request sent to a fixed AP, a mobile AP may send a list of files and/or bundles that it needs. The DTN may respond to such a request by sending the specific files and/or specific bundles of specific files using broadcast transmission(s), multicast transmission(s), or unicast transmission(s). A drawback of broadcasting the requested files/bundles is that other network nodes (e.g., mobile APs) may then have imposed on them, the work of processing the files/bundles that are broadcast, in spite of the fact that those network nodes may not need the same files and/or bundles. In the case of new files/bundles, however, it is likely that most network nodes (e.g., mobile APs) will not already have the files and/or bundles sent via broadcast and thus the broadcast may be an efficient way to deliver the files and/or bundles to nodes of the network.

In accordance with aspects of the present disclosure, network nodes (e.g., mobile APs) may request a list of the files and/or bundles that are available from a DTN server (e.g., DTN server 720). The network node may receive a response containing such a list from the DTN server, and may parse the list to identify bundles that the network node needs and that are available from the DTN server. The network node (e.g., mobile AP) may then request such bundles from the DTN server. Which files and/or bundles and/or how many such files and/or bundles are ultimately requested by the network node may be based on a number of factors including, for example, the quality of a communication link between the network node and, for example, a particular fixed AP within wireless communication range of the network node; and/or a prediction by the requesting network node (e.g., a mobile AP) of how long the network node will be in wireless communication range of the particular fixed AP. For example, a network node may request a larger portion of the content of a file and/or more bundles, when wireless link quality is high (e.g., one or more of RSSI, signal-to-noise ratio (SNR), bit-error-rate (BER), etc. is above/below a corresponding certain threshold) and/or the communication link to the fixed AP is expected to be long lived (e.g., above a certain amount of time). A drawback of this approach is that an increased number of control messages may be involved in servicing the request as compared to a situation in which the DTN server autonomously decides which files/bundles to disseminate, without considering input/requests from nodes of the network (e.g., mobile APs), which may result in an increase in network traffic/congestion. A strategy of requesting only specific bundles may, for example, be used with regard to requests for relatively older files, where it is more probable that few bundles are needed in order reconstruct a file.

In accordance with various aspects of the present disclosure, a DTN server (e.g., DTN server 720) may choose to unicast data via a specific network node (e.g., particular fixed AP) rather than broadcasting the data via a plurality of network nodes (e.g., two or more fixed APs). Data dissemination rules in accordance with various aspects of the present disclosure may, for example, dictate the use of a unicast approach for one or more bundle(s) of an older file, where there may be a relative higher probability that many of the network nodes (e.g., mobile APs) that would receive a broadcast of the one or more bundles(s) already have the bundle. Data dissemination rules may, however, dictate broadcasting of one or more bundle(s) of a new file, where there may be a relative higher probability that most of the network nodes (e.g., mobile APs) that would receive such a broadcast do not yet have the one or more bundle(s).

In accordance with various aspects of the present disclosure, a DTN server (e.g., DTN server 720) may continually or periodically broadcast/transmit bundles into the network, without waiting for requests from a network node (e.g., a mobile AP). In such an implementation, the DTN server may cycle through a list or rotation of the files/bundles that the DTN server has queued in storage. In some instances, the period of time between successive broadcast transmissions of a particular bundle of those bundles queued in storage may be according to a priority of the particular bundle, therefore bundles having a higher priority may come up in the rotation more often than lower priority bundles. A potential drawback of this approach is that a network node in need of a particular bundle may have to wait to receive the particular bundle until the position of the particular bundle in the rotation comes up while the network node in need of the bundle (e.g., a mobile AP) is within communication range of/connected to a network node (e.g., a fixed AP) that is broadcasting the particular bundle. Therefore, data dissemination rules in accordance with aspects of the present disclosure may dictate use of this approach only for new files/bundles that have at least a certain probability that those files/bundles are needed by at least a threshold number of network nodes (e.g., mobile APs).

In accordance with aspects of the present disclosure, a mobile AP may, for example, transmit downstream bundles to other mobile APs. Whether a particular bundle is broadcast or unicast by the sending mobile AP may depend, for example, on how many neighbors the sending mobile AP has, and the quality of the wireless communication path(s) that the sending mobile AP has to those neighbors. For example, when there are a large number of network neighbors (e.g., depending on the situation, more than 10, more than 20, or more than 30), broadcast transmission(s) may be used to reduce congestion on the wireless medium (which may already be taxed due to the relatively high density of mobile APs), as compared to the use of multiple unicast messages and any associated control messages. Conversely, where the density of network neighbors (e.g., other mobile APs) is relatively low (e.g., less than 10, less than 20, less than 30), and thus congestion on the wireless medium is relatively lower, the use of unicast transmissions may be preferred. As another example, broadcast transmission(s) may be used for relatively newer bundles which are not likely to have already been received by many of the neighbor nodes, whereas unicast transmission(s) may be used for bundles which are likely already in possession of many/most of the neighbor nodes (e.g., depending upon a particular threshold probability that a certain threshold number of neighbor nodes already have the bundles).

In accordance with various aspects of the present disclosure, a first network node (e.g., a mobile AP) may continually or periodically broadcast a list of files and/or bundles that the first network node has available (e.g., in storage), and then a second network node (e.g., another mobile AP) receiving such broadcasts may, for example, request that the first network node transmit specific bundles that the second network node needs. For example, a particular mobile AP broadcasting a list of the bundles that the particular mobile AP has available for access by other network nodes helps to reduce network congestion and the wasting of resources in the network, by preventing what may be referred to herein as "blind requests" from other nodes (i.e., requests directed at the particular mobile AP for bundles that the particular mobile AP does not have). Whether a particular network node (e.g., a mobile AP) broadcasts or unicasts a particular bundle in response to a request for the particular bundle may be decided based on, for example, a determination (e.g., by the particular network node) of how many network nodes (e.g., mobile APs) that are neighbors or the particular network node are in need of the particular bundle, the amount of congestion on the wireless medium, and/or other context information.

In accordance with various aspects of the present disclosure, a network node (e.g., a mobile AP) may continually or periodically broadcast/transmit bundles into the network without waiting for requests from other (e.g., neighboring) network nodes (e.g., other mobile APs). For example, a mobile AP may cycle through a rotation when broadcasting the files/bundles that the mobile AP currently has in storage. In some instances, bundles that have a higher priority may be scheduled in the rotation more often than bundles having a lower priority. In some situations, a network node in need of a particular bundle may be required to wait until the desired bundle appears in the rotation of nodes that are broadcast, while the network node is connected to a fixed AP. Thus, data dissemination rules according to the present disclosure may, for example, dictate the use of this approach of continually or periodically broadcasting bundles stored on a particular mobile AP only for new files/bundles and/or when there is a relative high mobile AP density in the area of the particular mobile AP, and thus where there is at least some threshold probability of reaching some threshold number of mobile APs that are in need of the particular bundle.

In accordance with various aspects of the present disclosure, a determination of whether mobile APs transmit downstream bundles for dissemination may, for example, be based on a frequency of contact between mobile APs and fixed APs. For example, in network conditions in which every mobile AP is likely to come in contact with a fixed AP within some threshold amount of time, one or more mobile APs of the network may not broadcast downstream bundles at all, and may leave dissemination of bundles to the fixed APs of the network. Conversely, when the frequency and/or duration of wirelessly connections between the mobile APs and the fixed APs of the network is below certain threshold values, the mobile APs may then also broadcast downstream bundles to aid in the dissemination of the bundles.

In accordance with aspects of the present disclosure, any particular mobile AP may receive broadcasts from multiple other network nodes (e.g., neighboring mobile APs that are within wireless communication range of the particular mobile AP), where the broadcasts may advertise bundles that are available from those neighboring network nodes. In such an arrangement, a mobile AP may then intelligently select which of the advertised bundles to request from each of the neighboring nodes in order to maximize the likelihood and/or the efficiency with which it receives the bundles that the network node (e.g., mobile AP) needs.

In accordance with various aspects of the present disclosure, a particular network node (e.g., a particular mobile AP) that is broadcasting bundles requested by one or more neighbor nodes (e.g., one or more neighboring mobile APs) may keep track of which bundles the particular network node has broadcast, so as to avoid redundant broadcasts (e.g., where two neighbors simultaneously, or nearly so, request the same bundle). The network node may also keep track of the bundles sent/broadcast by any neighboring network nodes (i.e., nodes within wireless communication range), to avoid broadcasting bundles already broadcast by a neighboring node. In accordance with aspects of the present disclosure, a network node that is broadcasting bundles may keep track of ACKs received from neighboring nodes, and may use the list of ACKs to decide whether to rebroadcast a bundle which the network node previously broadcast. Such a list may also be used in deciding whether to unicast or broadcast a particular bundle. For example, where more than a certain threshold number of requests for a particular bundle have been received by a network node (e.g., a mobile AP), it may be relatively likely that most mobile APs in the network are in need of that particular bundle, and thus the particular bundle should be scheduled for broadcast.

In accordance with various aspects of the present disclosure, a network node (e.g., a mobile AP) that is in need of a specific bundle may, for example, broadcast a request for that specific bundle to its neighbor nodes (i.e., those network nodes within wireless communication rage), without knowing whether any of the neighbor nodes are in possession of the specific bundle. This situation may, in some instances, result in many wasted transmissions when none of the neighbor nodes are in possession of the specific bundle. Accordingly, this approach may, for example, be used only when a number of bundles less than a certain threshold are needed and/or when a large number of neighbor nodes are present such that the probability that at least one of the neighbor nodes will have the requested bundle is above a certain threshold value. In such a situation, the requesting network node (e.g., a mobile AP) upon receipt of the requested bundle(s) may then have all of the bundles that make up a complete file and may make use of the file. For many types of files, having anything less than 100% of the file may make the file unusable. Therefore, the network node (e.g., mobile AP) in need and requesting one or more bundles of a file may not be able to take action on the file until 100% of the file has been received.

A variety of methods may be used by network nodes for coordinating broadcasts by multiple network nodes (e.g., mobile APs) in order to reduce the occurrence of collisions between the broadcasts and/or otherwise ensure the efficient dissemination of bundles among the nodes of the network (e.g., to prevent two or more neighbors from broadcasting the same bundle simultaneously or in close succession). In accordance with various aspects of the present disclosure, a time division multiplexing technique may be used such that different nodes of the network (e.g., mobile APs) are allocated different timeslots during which to broadcast downstream data. In an alternate arrangement according to the present disclosure, a token passing scheme may be used such that the token is periodically passed from one network node to another, and in which the network node (e.g., mobile AP) that is currently in possession of the token is permitted to broadcast one or more bundles.

In accordance with various aspects of the present disclosure, network elements such as, for example, the Cloud, fixed APs, and/or mobile APs may be operable to, for example, determine the probability of any particular mobile AP being in a particular geographic region or at a particular geographic location, being within wireless communication range of another network node (e.g., any mobile AP and/or a specific other mobile AP), and/or being within wireless communication range of a fixed AP (e.g., any other fixed AP and/or a specific other fixed AP). For example, for a particular mobile AP on a defined route (e.g., a mobile AP installed on a train or bus travelling a pre-defined schedule of stops), it may be possible to estimate the times at which the particular mobile AP will be within wireless communication range of certain fixed APs or certain other mobile APs, based on the route/schedule of the particular mobile AP and the locations of the other network nodes (e.g., fixed APs or other mobile APs) along the scheduled route. In accordance with aspects of the present disclosure, the Cloud may, for example, track historical geographic locations of mobile APs, geographic location of interactions among mobile APs, and geographic locations of interactions between mobile APs and fixed APs, and may use such historical information to identify patterns that may then be used to estimate/predict geographic locations at which one or more APs may establish wireless communication with other network nodes (e.g., other mobile APs or fixed APs). The Cloud may then disseminate this historical information among the nodes of the network (e.g., mobile APs and/or fixed APs) using techniques such as those described above. It should be noted that the nodes of a network such as that described herein may report their current geographic location occasionally or at regular time intervals, which may be shared with the Cloud and/or directly with other network nodes (e.g., with neighboring nodes) via broadcast and/or unicast transmissions, to enable all nodes of the network to have information available about the geographic location of the other nodes of the network.

Figure 10A:
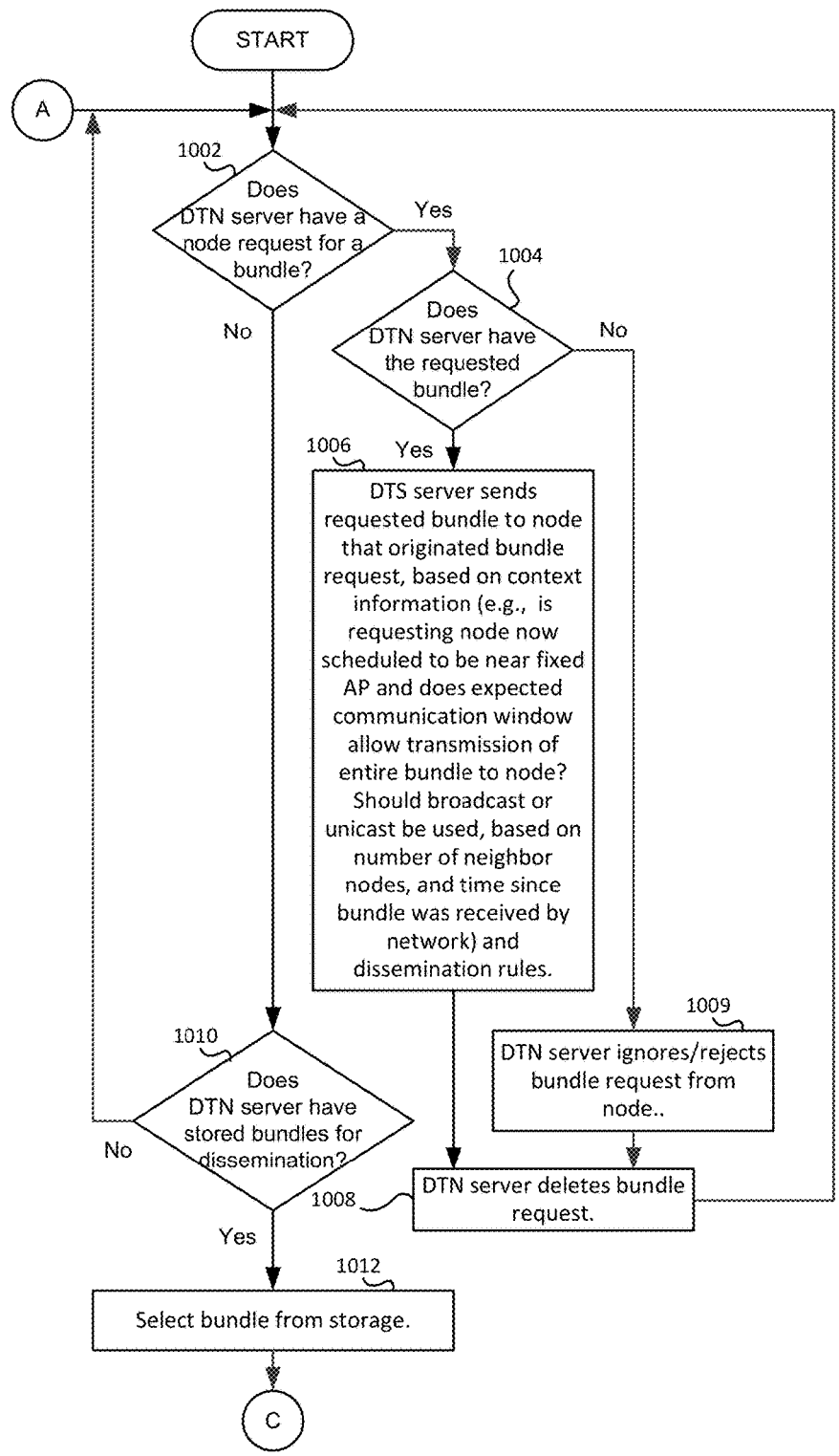
FIGS. 10A-10C are a flowchart illustrating an example process for managing the data storage/retention, routing, replication, and dissemination of data in the download direction of a network of moving things, in accordance with various aspects of the present disclosure.
Figure 10B:
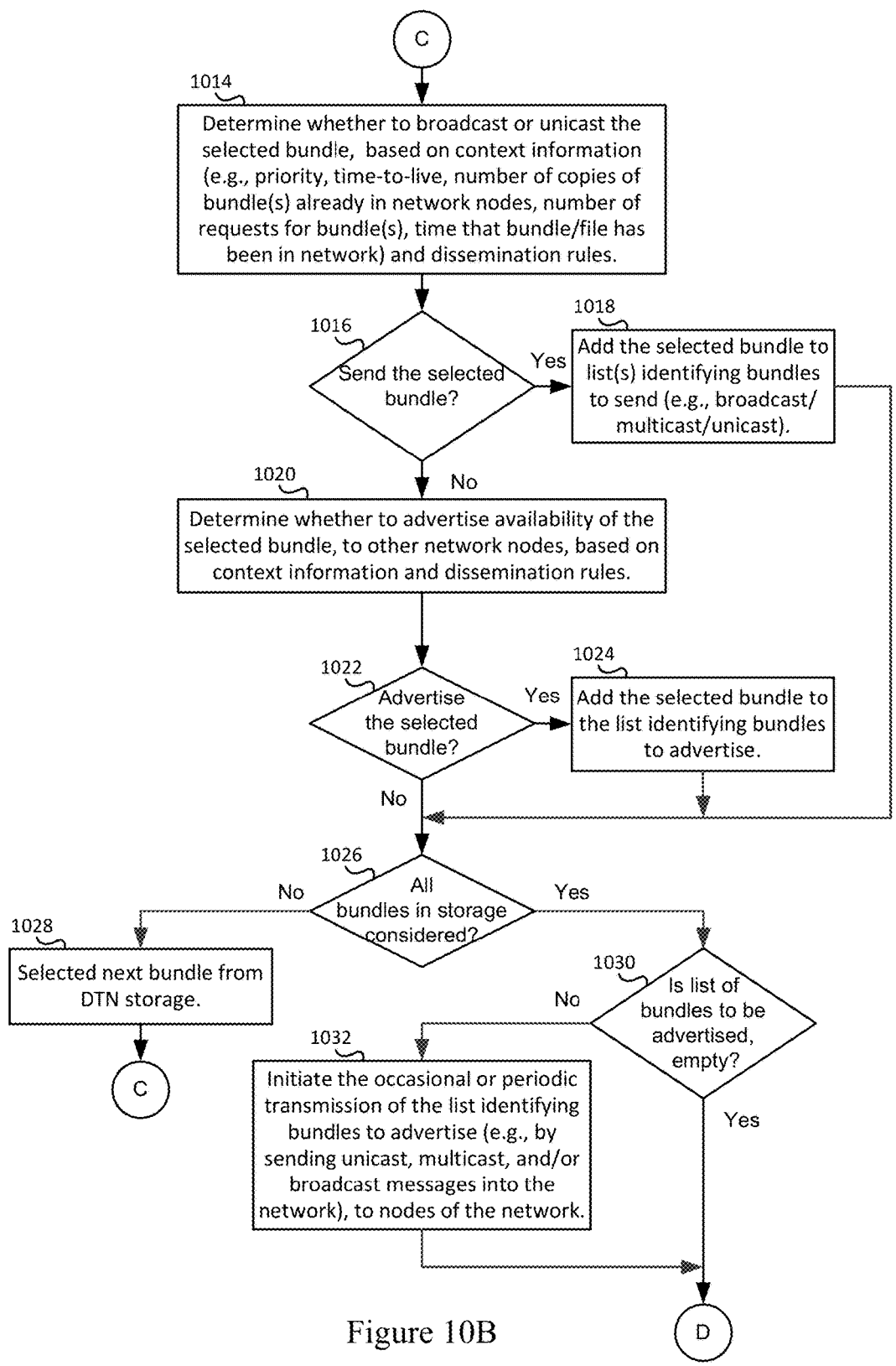
Figure 10C:
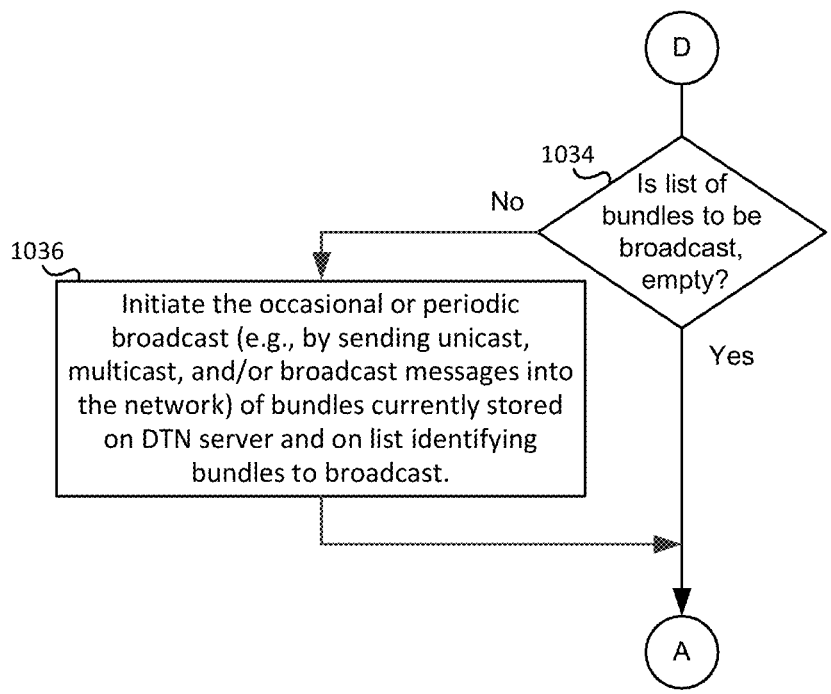

FIGS. 10A-10C are a flowchart illustrating an example process for managing the data storage/retention, routing, replication, and dissemination of data in the download direction of a network of moving things, in accordance with various aspects of the present disclosure. FIGS. 10A-10C show additional details of some of the actions of the flowchart 900 illustrated in FIG. 9 and previously described above. The method of FIGS. 10A-10C may be performed by, for example, a node (e.g., a DTN server such as DTN server 720 of FIG. 7) of a network as illustrated and described in regards to FIGS. 1-9. The following discussion makes frequent reference to the use of "context information." Additional details about the nature of such "context information" are described below, and have been previously described above.

The method of FIGS. 10A-10C may, for example, be initiated at the startup of a suitable element of the network (e.g., as a process/thread started on a computer system such as, for example, DTN server 720, when an underlying operating system begins running), and may run on a continuing basis, once started. The actions of the method begin at block 1002, where a determination is made as to whether a computer system such as, for example, the DTN server 720 has a pending request from a network node requesting a bundle of data. The nature of such a "bundle" is described above. If, at block 1002, it is determined that the DTN server does not have a pending request from a network node requesting a bundle of data, the method of FIG. 10A continues at block 1010, described below. If, however, at block 1002, it is determined that the DTN server does have a pending request from a network node that requests a bundle of data, the method may continue at block 1004, where the method determines whether the DTN server has the requested bundle. The data contained in the bundle may, for example, be received by the DTN server from a Cloud-based source and assembled into one or more bundles for dissemination into the network described herein. If, at block 1004, it is determined that the DTN server has the requested bundle then, at block 1006, the DTS server may send the requested bundle to the node that originated the bundle request, based on current context information for nodes of the network. Such context information may include, for example, information that may be used to determine whether the node that submitted the bundle request is scheduled to currently be within wireless communication range of a fixed AP through which the requested bundle may be communicated to the requesting node, and/or information that may be used to determine whether a window of opportunity to wirelessly communicate with the requesting node is expected to be sufficiently long to permit transmission of the entire bundle to the requesting node. Such context information may include, for example, information that may be used to determine whether broadcast, multicast, or unicast communication/addressing may be used, information that indicates the number of neighbor nodes currently within wireless communication range of the requesting node, and an indication of the amount of time that has passed since the requested bundle was received by network, in addition to various dissemination rules. The method may then continue at block 1008, where the DTN server may then delete the bundle request just fulfilled, and then return to block 1002. If however, at block 1004, it is determined that the DTN server does not have the bundle requested by the node, then the method may continue at block 1009, where the DTN server may ignore or reject the bundle request from the node. The method of FIG. 10A may then continue at block 1008, described above.

If, at block 1002, it was determined that the DTN server does not have a pending request from a network node requesting a bundle of data, the method of FIG. 10A continues at block 1010, where a determination may be made as to whether the DTN server has bundles in storage, awaiting dissemination. If it is determined, at block 1010, that the DTN server does not have stored bundles of data for dissemination, the method continues at block 1002, discussed above. If, however, it is determined, at block 1010, that the DTN server does have stored bundles of data for dissemination, control passes to block 1012, where the DTN server performing the method may select a bundle from the bundle(s) in storage. The method then continues at block 1014 of FIG. 10B.

At block 1014 of FIG. 10B, the method determines whether to send the selected bundle (e.g., via broadcast multicast, or unicast), based on context information (e.g., priority of the bundle, "time-to-live," number of copies of the bundle(s) already in network nodes, a number of requests for bundle(s), an amount of time that the bundle/file has been in network) and dissemination rules. Next, at block 1016, the method may, based on whether the determination of block 1014 is to send the selected bundle, transition to block 1018, where the method may add the selected bundle to one or more list(s) identifying bundle(s) to be sent to downstream network nodes (e.g., FAPs, MAPs). The method of FIG. 10B then continues at block 1026, described below. If, however, at block 1016, the determination of block 1014 is to not send the selected bundle, the method then continues at block 1020, where the DTN server performing the method may determine whether to advertise the availability of the selected bundle to other network nodes (e.g., downstream MAPs/FAPs), based on, for example, context information such as described herein, and dissemination rules for the downstream direction of the bundle. Next, at block 1022, the determination of block 1020 may result in the flow of the method passing to block 1024, if it was determined at block 1020 that the selected bundle is to be advertised to other network nodes. At block 1024, the selected node may be added to one or more lists of bundle(s) to be advertised to other network nodes, and control then passes to block 1026, described below.

At block 1026, the method checks whether all stored bundles have been considered for advertising or sending, and if not all bundles have been considered, the method continues at block 1914, described above. However, if at block 1026 it is determined that all stored bundles have been considered, then the method passes to block 1030, where the method determines whether the list(s) of bundles to be advertised are empty. If at block 1030 the list(s) of bundles to be advertised are found to be empty, the method continues at block 1034 of FIG. 10C, described below. If, however, at block 1030, the list(s) of bundles to be advertised are found to include information identifying one or more bundles to be advertised then, at block 1032, the method may initiate the occasional or periodic transmission of the contents of the list(s) identifying bundles to advertise to other nodes of the network (e.g., by sending unicast, multicast, and/or broadcast messages into the network, based on context information such as, for example, a number of nodes that are within wireless communication range, the number and ages of bundles to be advertised, and/or the number of copies of the bundles to be advertised, that are already present in nodes of the network). The method of FIGS. 10A-10C then continues at block 1034 of FIG. 10C, described below.

At block 1034, a determination is made as to whether the list(s) of bundles to be sent (e.g., broadcast, multicast, or unicast) to other network nodes are empty. If the list(s) of bundles to be sent are found to be empty, the method passed control to block 1002, described above. If, however, the list(s) of bundles to be sent are found, at block 1034, to contain information identifying bundles to be sent to other network nodes, then the DTN server (e.g., DTN server 720 of FIG. 7) may initiate the occasional or periodic dissemination (e.g., by sending unicast, multicast, and/or broadcast messages into the network) of bundles currently stored on the DTN server and identified on the list of bundles to be sent. The method of FIG. 10C then passes control to block 1002, described above.

FIGS. 11A through 11E are a flowchart 1100 illustrating an example method of managing the storage/retention, routing, replication, and dissemination of bundles of data in the download direction by a node such as, for example, a fixed or mobile access point of a network of moving things, in accordance with various aspects of the present disclosure. FIGS. 11A-11E show additional detail of some of the actions of the flowchart illustrated in FIG. 9. The method of FIGS. 11A-11E may be performed by, for example, a node (e.g., a fixed AP or mobile AP) of a network as illustrated and described above in regards to FIGS. 1-9. The following discussion makes frequent reference to the use of "context information" and a data "bundle," additional details of the nature of which have been previously described above. The method of FIGS. 11A-11E may, for example, be initiated at the startup of various nodes of the network (e.g., as a process/thread started when an underlying operating system begins running), and may run on a continuing basis, once started. It should be noted that the actions shown in FIGS. 11A-11E may not be performed in the order shown, and that actions of a block may, for example, be performed by a separate process/thread, while the process/thread of the method as a whole continues on with other actions.

Figure 11A:
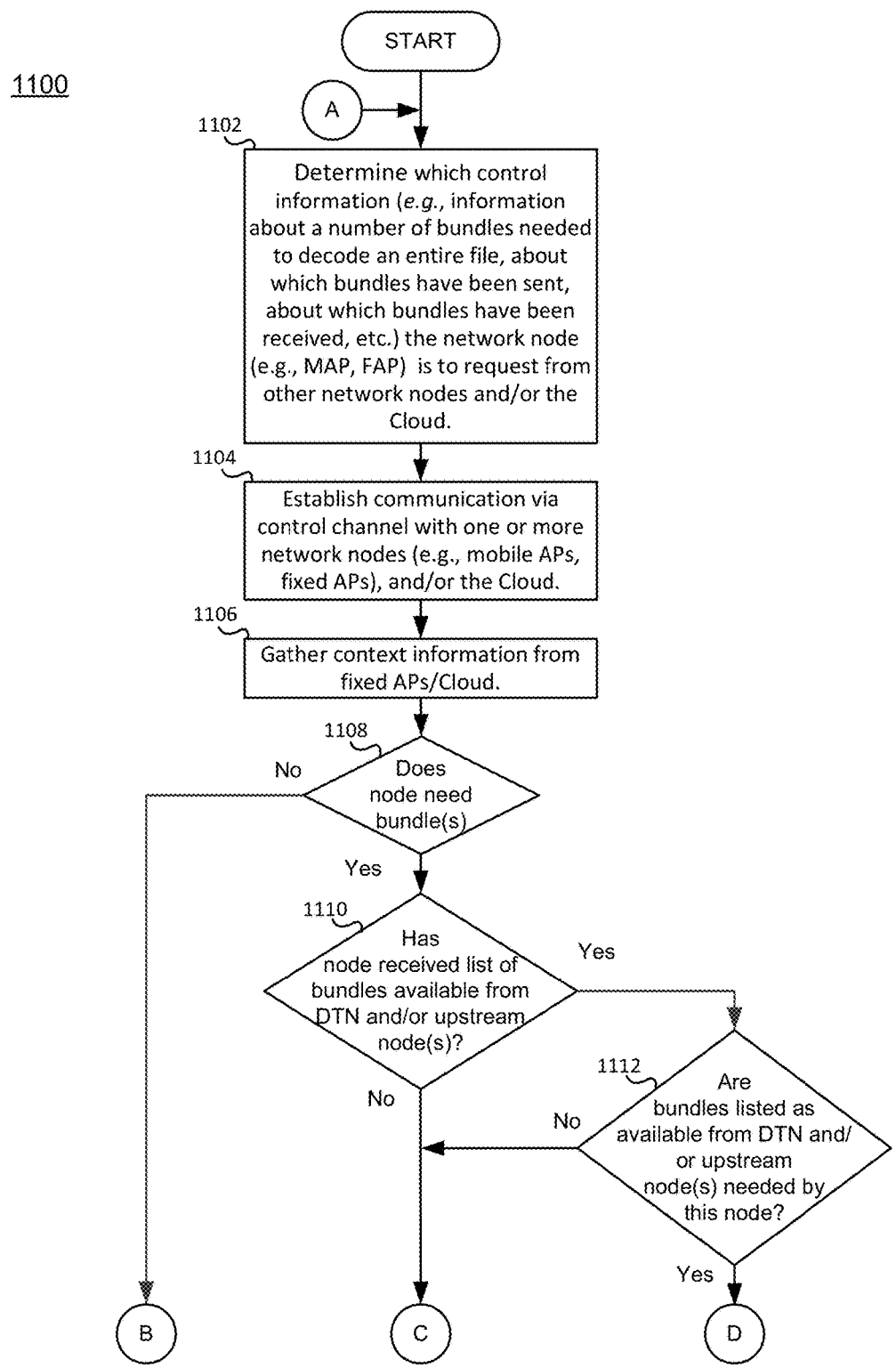
FIGS. 11A through 11E are a flowchart illustrating an example method of managing the storage/retention, routing, replication, and dissemination of bundles of data in the download direction by a node such as, for example, a fixed or mobile access point of a network of moving things, in accordance with various aspects of the present disclosure.

The actions of the method of FIGS. 11A-11E begin at block 1102 of FIG. 11A, where the network node (e.g., a fixed AP or mobile AP) may determine which control information and/or context information (e.g., information about a number of bundles needed to decode an entire file, about which bundles of data have been sent, about which bundles have been received, etc.) the network node (e.g., MAP, FAP) is to request from other network nodes and/or the Cloud. Next, at block 1104, the method may establish communication via a control channel with one or more network nodes (e.g., mobile APs, fixed APs), and/or the Cloud, and may then, at block 1106, gather various context information from fixed APs, mobile APs, and/or the Cloud (e.g., See FIG. 1, Cloud 730 of FIG. 7).

At block 1108, the network node performing the method may determine whether the node needs any bundles of data (e.g., to complete assembly of any files for which portions are missing). If no data bundles are presently needed by the node, the method continues at block 1122 of FIG. 11B, described below. If, however, one or more bundles are needed by the node, the method passes control to block 1110, where the method may determine whether the node has received a list of bundles available from a DTN server and/or other network nodes that are upstream of this node. If the node performing the method determines that no list of bundles available from other nodes has been received by this node, the method continues at block 1118, described below. If, however, it was determined, at block 1110, that the present node has received a list of bundles available from a DTN server or other network nodes, the method of FIG. 11A continues at block 1112, where the node performing the method determines whether any of the bundles listed as available from a DTN server or other network nodes are needed by the present node. If it is determined, at block 1112, that none of the bundles listed as being available are needed by the present node, the method continues at block 1118. However, if one or more of the bundles needed by the present node are listed as available from a DTN server or one or more other network nodes, the method continues at block 1114 of FIG. 11B, discussed below.

Figure 11B:
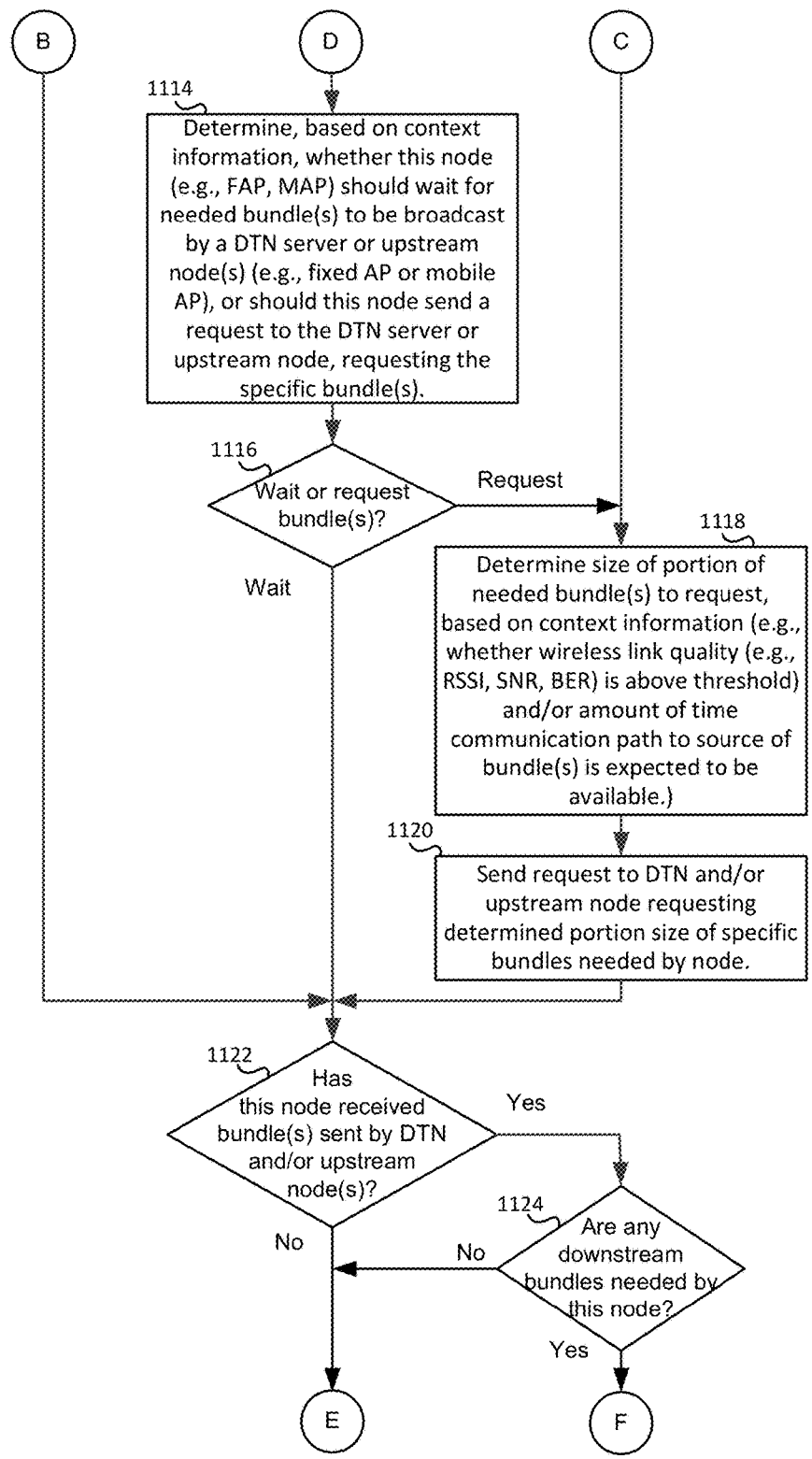

At block 1114 of FIG. 11B, the node performing the method of FIG. 11B may determine, based on context information, whether the present node (e.g., a FAP or MAP) should wait for a DTN server or upstream node(s) (e.g., a fixed AP or a mobile AP) to autonomously send the needed bundle(s) (e.g., occasionally or periodically broadcast, multicast, or unicast bundles), on its own initiative, or whether the present node should send an explicit request to a DTN server or upstream node, explicitly asking that the specific bundle(s) needed by the present node be sent to the present node. At block 1116, the determination of block 1114 may cause the method to continue at block 1118 (discussed below), if it is determined at block 1114 that a request for the needed bundle(s) should be sent, or to continue at block 1122, if it is determined at block 1114 that the present node should wait for a DTN server or other network nodes to autonomously send the needed bundles to the present node.

At block 1118, the method of FIG. 11B may determine size of a portion of the needed bundle(s) to request from the DTN server or other network nodes, based on context information. For example, the requesting node may employ context information that permits the node to determine whether the quality of a wireless link (e.g., RSSI, SNR, BER) of the present node or intermediate network nodes is above certain threshold that is expected to permits wireless communication, and/or determine an amount of time that a wireless communication path connecting the requesting node (e.g., a mobile AP) and the source of the needed bundle(s) (e.g., a fixed AP or neighbor mobile AP) can be estimated to be usable for communication of the needed bundles to the requesting node. Using such types of information may enable a network node such as, for example, a mobile AP requesting data bundle(s) to determine how large a portion of data may be expected to be successfully transferred using wireless links during the movement of the node, so that the requesting node may seek transfer of data bundle(s) limited to the determined portion of the bundle(s). Next, at block 1120, the requesting node may send a request to the DTN server and/or other network nodes, requesting the transfer of the determined amount/portion size of the specific bundles needed by the requesting node. The method then continues at block 1122, described below.

At block 1122, a determination may be made as to whether the node performing the method has received one or more bundles autonomously sent by a DTN server and/or one or more other network nodes (e.g., an unsolicited broadcast, multicast, or unicast of bundles stored by those other network nodes). If, at block 1122, it is determined that unrequested bundles have been received by the present node, the method of FIG. 11B continues at block 1124. If, however, at block 1122, it is determined that no unrequested bundles have been received by the present node, the method continues at block 1128 of FIG. 11C. At block 1124, the method determines whether any of the unrequested/unsolicited bundles received from a DTN server or other network nodes are actually needed by the present none. If none of the received unrequested bundles are needed by the present node, the method may then proceed to block 1128 of FIG. 11C, discussed below. However, if unrequested/unsolicited bundles received by the present node are needed by the presented node, the method may continue at block 1126 of FIG. 11C.

Figure 11C:
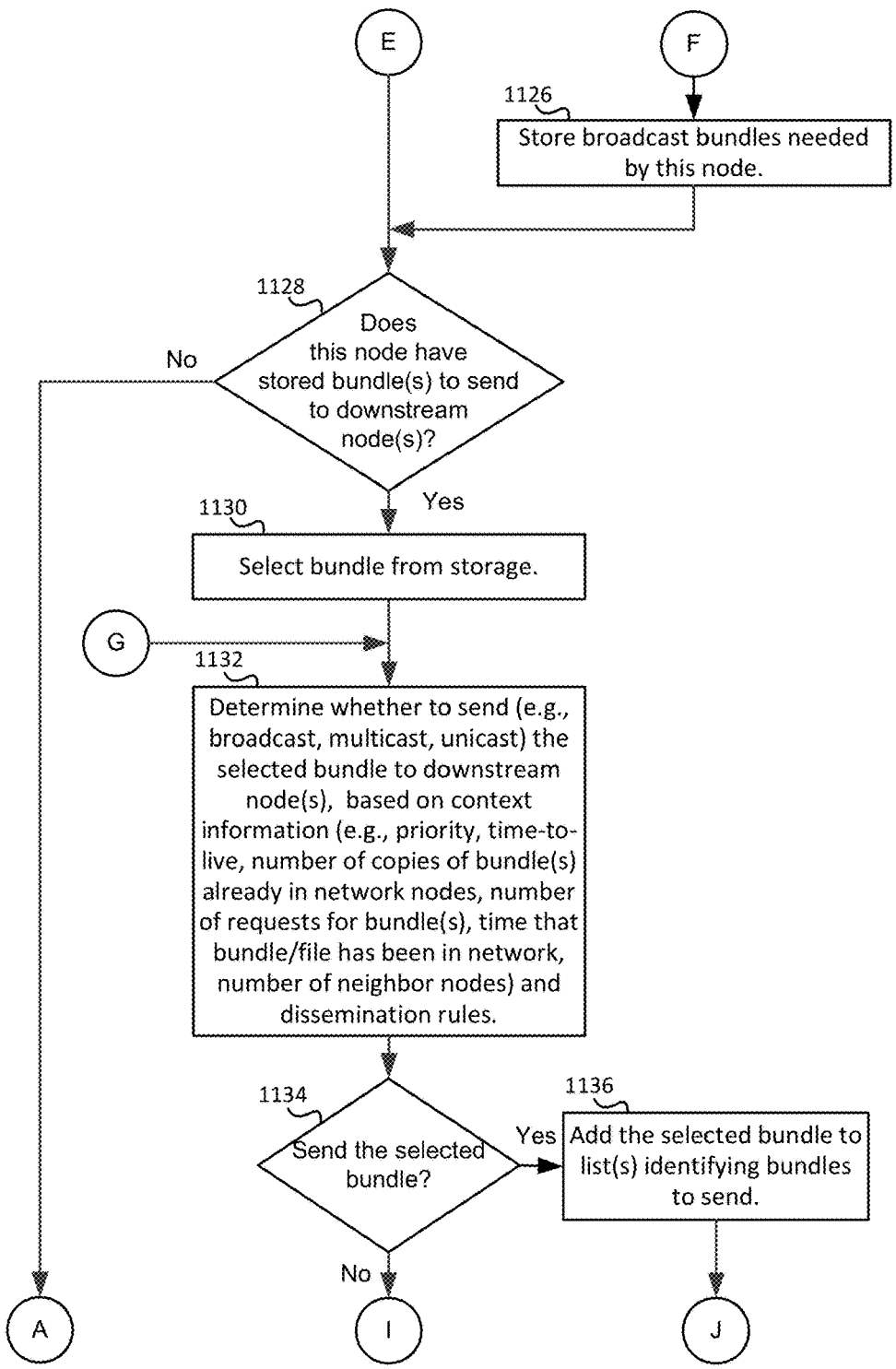

At block 1126 of FIG. 11C, the node performing the method may store the unrequested/unsolicited bundles (e.g., bundles sent autonomously by the DTN server or other network nodes) in memory of the present node. The method may then direct the node to continue at block 1128.

At block 1128 of FIG. 11C, the method checks whether the present node has any bundles in storage that it might send unsolicited/unrequested to other network nodes that are downstream from the present node. If it is determined, at block 1128, that the present node has no stored bundles to share with other nodes, the method of FIG. 11C may return to block 1102, discussed above. If, however, it is determined at block 1128 that the present node does have bundles that may be sent wirelessly, without a prior request, to other network nodes, then at block 1130, the method may select one of the stored bundles, and at block 1132, may determine whether to send the selected bundle to downstream node(s) (e.g., using a broadcast, multicast, unicast approach), based on context information gathered by the present node. Such context information may include, for example, priority values assigned to each of the stored bundle(s), a "time-to-live" value assigned to each stored bundle(s), a number of copies of the stored bundle(s) already known to reside in other nodes of the network, a number of existing requests for the selected bundle(s), an amount of time that the stored bundle(s) have been in the network (e.g., the age of the bundle), and a number of neighbor nodes currently within wireless communication range of the present node. Dissemination rules that apply to the transfer of bundles in the downstream direction may also be taken into account.

Next, at block 1134, if it was determined at block 1132 that the selected bundle is to be sent, the flow of control of the method passes to block 1136, where the selected bundle is added to one or more lists identifying stored bundles to send unsolicited to other (e.g., downstream) nodes of the network. The method then continues at block 1144 of FIG. 11D. If, however, it is determined at block 1132 that the selected bundle is not to be sent, the flow of control of the method passes to block 1138 of FIG. 11D.

Figure 11D:
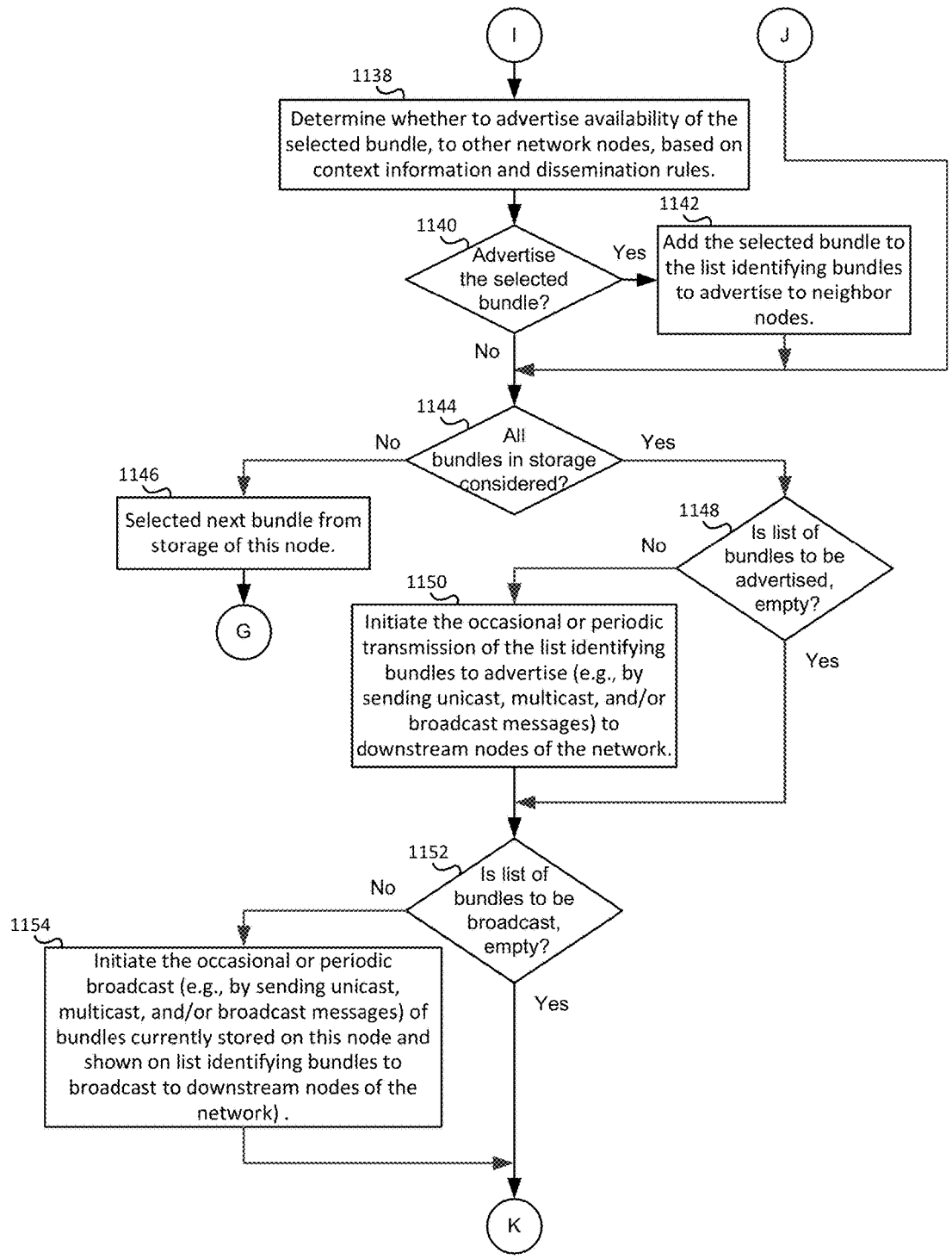
Figure 11E:
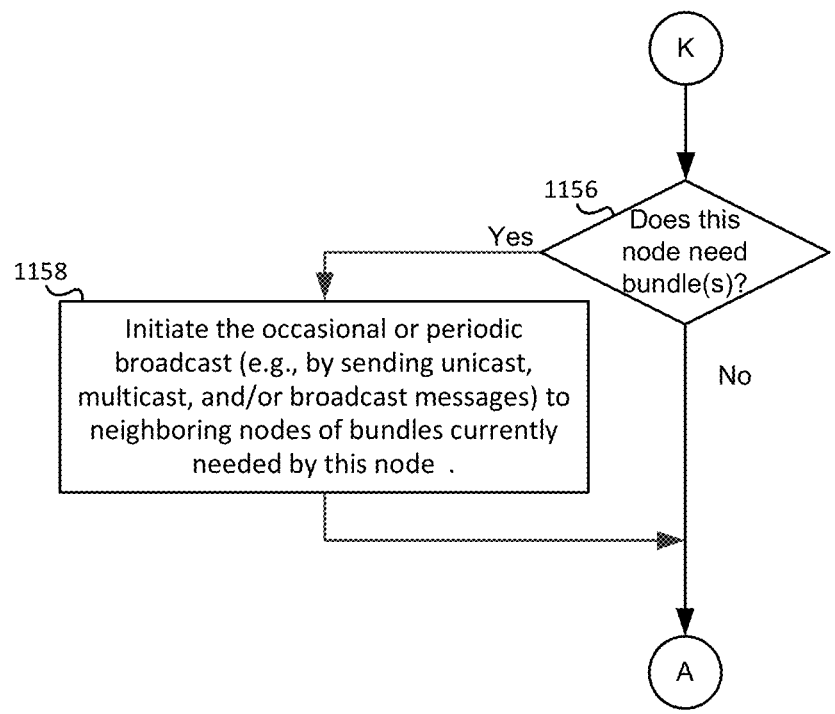

At block 1138 of FIG. 11D, a determination is made whether to advertise availability of the selected bundle, to other network nodes, based on context information (e.g., as discussed above herein) and dissemination rules (e.g., for a downstream direction of transfer). Next, at block 1140, based on the determination of block 1138, the method may proceed to block 1142 if the selected bundle is to be advertised to other network nodes, or proceed to block 1144 is the selected bundle is not to be advertised to other network nodes. At block 1142, information identifying the selected bundle is added to one or more lists identifying bundles to be advertised to other (e.g., neighboring) network nodes, and the method proceeds to block 1144.

At block 1144 of FIG. 11D, the method determines whether all bundles stored at the present node (e.g., a fixed AP or mobile AP) have been considered for unsolicited transmission or advertisement to other nodes of the network. If it is determined that not all bundles stored at the present node have been considered, at block 1146, the next stored bundle may be selected, and the method proceeds to block 1132, discussed above. If, however, it is determined, at block 1144, that all of the bundles stored at the present node have been considered for unsolicited transmission or advertisement, the method may then proceed to block 1148.

At block 1148, a check is made to determine whether the list of bundles to be advertised to other network nodes, is empty. If, at block 1148, the list of bundles to be advertised to other network nodes is found to be empty, the method proceeds to block 1152. However, if at block 1148 the list of bundles to be advertised to other network nodes is not found to be empty then, at block 1150, the method may initiate the occasional or periodic transmission of the list identifying bundles to be advertised (e.g., by sending unicast, multicast, and/or broadcast messages) by the present nodes to other nodes of the network (e.g., nodes (e.g., mobile APs) that are downstream of the present node). Such transmission of information about the bundles stored at and available from the present node may be performed as a process that once initiated runs for a given period of time, or a specified number of transmissions/advertisements, while other activities described with respect to FIGS. 11A-11E continue. From block 1150, the method of FIG. 11D may then proceed to block 1152, discussed below.

At block 1152 of FIG. 11D, a check is made to determine whether the list of bundles to be sent, unsolicited, to other network nodes, is empty. If, at block 1152, the list of bundles to be transmitted, unsolicited, to other network nodes is found to be empty, the method proceeds to block 1156 of FIG. 11E. However, if at block 1152 the list of bundles to be sent, unsolicited, to other network nodes is not found to be empty then, at block 1154, the method may initiate the occasional or periodic transmission of the bundles currently stored on the present node by the present node (e.g., by sending the bundles in unicast, multicast, and/or broadcast messages) to other nodes of the network (e.g., nodes (e.g., mobile APs) that are downstream of the present node). Again, transmission of the bundles stored at and available from the present node may, for example, be performed as a process that once initiated runs for a given period of time, at specific intervals, or for a specified number of transmissions/advertisements, while other activities described with respect to FIGS. 11A-11E continue. From block 1154, the method of FIG. 11D may then proceed to block 1156, discussed below.

At block 1156, the method determines whether the present node needs any bundles that it currently does not have. For example, the present node may need a particular file the contents of which may be packaged in a single bundle, or across multiple bundles, and the present node may not have all bundles that contain portions of the particular file that is needed. If it is determined, at block 1152, that no bundles are needed by the present node, the method of FIG. 11E proceeds to block 1102, previously discussed above. If, however, at block 1156, it is determined that the present node needs one or more bundles that it currently does not have then, at block 1158, the present node may initiate the occasional or periodic transmission (e.g., by sending unicast, multicast, and/or broadcast messages) of information identifying those bundles that are currently needed by this node.

As in other similar situations of sharing information among nodes of a network according to the present disclosure (e.g., advertising bundles that are available from a node, making unsolicited/unrequested transmissions of bundles to nodes of the network), such transmissions may be made/managed by a thread or process that is initiated according to block 1158, and may, for example, operate continuously, operate periodically at regular or irregular intervals of time, or operate until a certain number of transmissions of the information describing/identifying the bundles needed by the present node have been completed.

Various aspects of the present disclosure may be found in a method of routing and disseminating data by nodes of a wireless network comprising a plurality of nodes. Each of the plurality of nodes may comprise at least one radio frequency interface for communicating wirelessly with other nodes of the network. Such a method may comprise receiving, by a first node of the plurality of nodes from a Cloud-based system communicatively coupled to the network, one or more bundles of data for wireless dissemination to the plurality of nodes, where each bundle of data comprises one or more packets of data and corresponding bundle context information. The method may also comprise generating, by the first node from wireless signals received from one or more other nodes of the plurality of nodes that are within wireless communication range of the first node, wireless network context information representative of wireless communication of the one or more other nodes. The method may further comprise determining, by the first node, a number of bundles of data present in storage of the first node. If at least one bundle of data is available in the storage of the first node, the method may comprise choosing to perform, by the first node using the bundle context information, the wireless network context information, and a set of data dissemination rules for the first node, transmitting an advertisement of availability of the at least one bundle of data at the first node, to a second node of the plurality of nodes. The method may alternatively comprise choosing transmitting the at least one bundle of data to the second node, without receipt, by the first node from the second node, of a corresponding request for the at least one bundle. The method may, in addition, comprise choosing to not perform transmitting the advertisement and to not perform transmitting a bundle of data, if at least one bundle of data is not available in the storage of the first node.

In accordance with aspects of the present disclosure, the bundle context information may comprise any one of the following: a priority of the one or more bundles of data, an age in the network of the one or more bundles of data, an amount of time to live of the one or more bundles of data, and/or a total number of copies of each specific bundle of the one or more bundles of data currently residing within the plurality of nodes of the network. Wireless network context information may comprise one or both of a number of the one or more other nodes, and a measure of quality of wireless communication of the first node and the one or more other nodes. The choosing may take into account a set of data dissemination rules for the first node for a direction of communication of bundles of data received by the first node from the Cloud-based system. The set of data dissemination rules may be selected from two or more sets of data dissemination rules comprising a first set of data dissemination rules for a downstream direction of transfer of bundles of data through the network and a second set of data dissemination rules for an upstream direction of transfer of bundles of data through the network. The upstream direction may be towards the Cloud-based system and the downstream direction may be away from the Cloud-based system. The plurality of nodes may comprise one or more nodes that are located at a fixed geographic location and one or more nodes that are mobile. The first node may be configured for operation at a fixed geographic location, and the second node may be configured for operation in a vehicle movable about a service area of the network. The second node may be a mobile access point configured to wirelessly communicate via the network, data of end-user devices accessing the network via the mobile access point.

In accordance with various aspects of the present disclosure, transmitting the at least one bundle of data from the first node to the second node may comprise determining that a number of available wireless communication links at the first node is two or more, based on the wireless network context information indicative of quality of communication of the first node with the one or more other nodes. Transmitting the at least one bundle of data from the first node to the second node via two or more wireless communication links may comprise replicating each bundle of data of the at least one bundle of data to enable transmission of a copy of the at least one bundle of data by the first node via a respective wireless communication link.

Various aspects of the present disclosure may be observed in a non-transitory computer-readable medium having a plurality of code sections, where each code section stores a plurality of instructions executable by one or more processors. The executable instructions may cause the one or more processors to perform a method of routing and disseminating data by nodes of a wireless network comprising a plurality of nodes, where the steps of the method are as described above.

Further aspects of the present disclosure may be seen in a system for a routing and disseminating data by nodes of a wireless network comprising a plurality of nodes. Such a system may comprise one or more processors operatively coupled to at least one wireless interface for communicatively coupling the first node to other nodes of the network. In such a system, the one or more processors may be operable to, at least, perform the steps of a method of managing routing and replication of data at a first node of a network, such as the method described above.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method of routing and disseminating data by nodes of a wireless network comprising a plurality of nodes, each of the plurality of nodes comprising at least one radio frequency interface for communicating wirelessly with other nodes of the network, the method comprising:

receiving, by a first node of the plurality of nodes from a second node of the plurality of nodes or from a Cloud-based system communicatively coupled to the network, information identifying each of one or more bundles of data available at the second node or at the Cloud-based system for wireless dissemination to the plurality of nodes, wherein each bundle of data comprises one or more packets of data and corresponding bundle context information comprising bundle size and bundle age information;

generating, by the first node from wireless signals received from one or more other nodes of the plurality of nodes that are within wireless communication range of the first node, wireless network context information representative of wireless communication of the one or more other nodes, wherein the wireless network context information comprises a respective measure of quality of wireless communication, a respective geographic location, and respective velocity information for the one or more other nodes;

determining, by the first node, a number of bundles of data present in storage of the second node or the Cloud-based system that are needed by the first node;

if at least one bundle of data is available in the storage of the second node or the Cloud-based system that is needed by the first node, choosing to perform an action selected from at least two available actions, based upon a likelihood of availability of wireless connectivity between the first node and the one or more other nodes that enables receipt of the at least one bundle of data from the second node or the Cloud-based system, wherein the likelihood of occurrence is determined, using the bundle context information, the wireless network context information, and a set of data dissemination rules for the first node, and wherein the at least two available actions comprise:

transmitting to the second node or to the Cloud-based system, a specific request for delivery of the at least one bundle of data to the first node, and waiting to receive the at least one bundle of data as part of a periodic transmission of the at least one bundle of data available at the second node or at the Cloud-based system to the plurality of nodes.

2. The method according to claim 1, wherein bundle context information comprises a total number of copies of each specific bundle of the one or more bundles of data currently residing within the plurality of nodes of the network.

3. The method according to claim 1, wherein wireless network context information comprises one or both of: a number of the one or more other nodes, and a measure of quality of wireless communication of the first node and the one or more other nodes.

4. The method according to claim 1, wherein the choosing takes into account a set of data dissemination rules for the first node for a direction of communication of bundles of data received by the first node from the Cloud-based system, and wherein the set of data dissemination rules is selected from two or more sets of data dissemination rules comprising a first set of data dissemination rules for a downstream direction of transfer of bundles of data through the network and a second set of data dissemination rules for an upstream direction of transfer of bundles of data through the network.

5. The method according to claim 4, wherein the upstream direction is towards the Cloud-based system and the downstream direction is away from the Cloud-based system.

6. The method according to claim 1, wherein the first node is configured for operation at a fixed geographic location.

7. The method according to claim 1, wherein the second node is configured for operation in a vehicle movable about a service area of the network.

8. The method according to claim 1, wherein the second node is a mobile access point configured to wirelessly communicate via the network, data of end-user devices accessing the network via the mobile access point.

9. The method according to claim 1, wherein transmitting the at least one bundle of data from the first node to the second node comprises determining that a number of available wireless communication links at the first node is two or more, based on the wireless network context information indicative of quality of communication of the first node with the one or more other nodes.

10. The method according to claim 9, wherein transmitting the at least one bundle of data from the first node to the second node via two or more wireless communication links comprises replicating each bundle of data of the at least one bundle of data to enable transmission of a copy of the at least one bundle of data by the first node via a respective wireless communication link.

11. A non-transitory computer-readable medium having a plurality of code sections, each code section storing a plurality of instructions executable by one or more processors to cause the one or more processors to perform a method of routing and disseminating data by nodes of a wireless network comprising a plurality of nodes, the steps of the method comprising:

receiving, by a first node of the plurality of nodes from a second node of the plurality of nodes or from a Cloud-based system communicatively coupled to the network, information identifying each of one or more bundles of data available at the second node or at the Cloud-based system for wireless dissemination to the plurality of nodes, wherein each bundle of data comprises one or more packets of data and corresponding bundle context information comprising bundle size and bundle age information;

generating, by the first node from wireless signals received from one or more other nodes of the plurality of nodes that are within wireless communication range of the first node, wireless network context information representative of wireless communication of the one or more other nodes, wherein the wireless network context information comprises a respective measure of quality of wireless communication, a respective geographic location, and respective velocity information for the one or more other nodes;

determining, by the first node, a number of bundles of data present in storage of the second node or the Cloud-based system that are needed by the first node;

if at least one bundle of data is available in the storage of the second node or the Cloud-based system that is needed by the first node, choosing to perform an action selected from at least two available actions, based upon a likelihood of availability of wireless connectivity between the first node and the one or more other nodes that enables receipt of the at least one bundle of data from the second node to the Cloud-based system, wherein the likelihood of occurrence is determined, using the bundle context information, the wireless network context information, and a set of data dissemination rules for the first node, and wherein the at least two available actions comprising:

transmitting to the second node or to the Cloud-based system, a specific request for delivery of the at least one bundle of data to the first node, and waiting to receive the at least one bundle of data as part of a periodic transmission of the at least one bundle of data available at the second node or at the Cloud-based system to the plurality of nodes.

12. The non-transitory computer-readable medium according to claim 11, wherein bundle context information comprises a total number of copies of each specific bundle of the one or more bundles of data currently residing within the plurality of nodes of the network.

13. The non-transitory computer-readable medium according to claim 11, wherein wireless network context information comprises one or both of: a number of the one or more other nodes, and a measure of quality of wireless communication of the first node and the one or more other nodes.

14. The non-transitory computer-readable medium according to claim 11, wherein the choosing takes into account a set of data dissemination rules for the first node for a direction of communication of bundles of data received by the first node from the Cloud-based system, and wherein the set of data dissemination rules is selected from two or more sets of data dissemination rules comprising a first set of data dissemination rules for a downstream direction of transfer of bundles of data through the network and a second set of data dissemination rules for an upstream direction of transfer of bundles of data through the network.

15. The non-transitory computer-readable medium according to claim 14, wherein the upstream direction is towards the Cloud-based system and the downstream direction is away from the Cloud-based system.

16. The non-transitory computer-readable medium according to claim 11, wherein the first node is configured for operation at a fixed geographic location.

17. The non-transitory computer-readable medium according to claim 11, wherein the second node is configured for operation in a vehicle movable about a service area of the network.

18. The non-transitory computer-readable medium according to claim 11, wherein the second node is a mobile access point configured to wirelessly communicate via the network, data of end-user devices accessing the network via the mobile access point.

19. The non-transitory computer-readable medium according to claim 11, wherein transmitting the at least one bundle of data from the first node to the second node comprises determining that a number of available wireless communication links at the first node is two or more, based on the wireless network context information indicative of quality of communication of the first node with the one or more other nodes.

20. The non-transitory computer-readable medium according to claim 19, wherein transmitting the at least one bundle of data from the first node to the second node via two or more wireless communication links comprises replicating each bundle of data of the at least one bundle of data to enable transmission of a copy of the at least one bundle of data by the first node via a respective wireless communication link.

21. A system for routing and disseminating data by nodes of a wireless network comprising a plurality of nodes, the system comprising:
one or more processors operatively coupled to at least one radio frequency interface for communicating wirelessly with other nodes of the network, the one or more processors operable to, at least:
receive, by a first node of the plurality of nodes from a second node of the plurality of nodes or from a Cloud-based system communicatively coupled to the network, information identifying each of one or more bundles of data available at the second node or at the Cloud-based system for wireless dissemination to the plurality of nodes, wherein each bundle of data comprises one or more packets of data and corresponding bundle context information comprising bundle size and bundle age information;
generate, by the first node from wireless signals received from one or more other nodes of the plurality of nodes that are within wireless communication range of the first node, wireless network context information representative of wireless communication of the one or more other nodes, wherein the wireless network context information comprises a respective measure of quality of wireless communication, a respective geographic location, and respective velocity information for the one or more other nodes;
determine, by the first node, a number of bundles of data present in storage of the second node or the Cloud-based system that are needed by the first node;
if at least one bundle of data is available in the storage of the second node or the Cloud-based system that is needed by the first node, choose to perform an action selected from at least two available actions, based upon a likelihood of availability of wireless connectivity between the first node and the one or more other nodes that enables receipt of the at least one bundle of data from the second node or the Cloud-based system, wherein the likelihood of occurrence determined using the bundle context information, the wireless network context information, and a set of data dissemination rules for the first node, and wherein the at least two available actions comprise:
transmitting to the second node or to the Cloud-based system, a specific request for delivery of the at least one bundle of data to the first node, and
waiting to receive the at least one bundle of data as part of a periodic transmission of the at least one bundle of data available at the second node or at the Cloud-based system to the plurality of nodes.

22. The system according to claim 21, wherein bundle context information comprises a total number of copies of each specific bundle of the one or more bundles of data currently residing within the plurality of nodes of the network.

23. The system according to claim 21, wherein wireless network context information comprises one or both of: a number of the one or more other nodes, and a measure of quality of wireless communication of the first node and the one or more other nodes.

24. The system according to claim 21, wherein the choosing takes into account a set of data dissemination rules for the first node for a direction of communication of bundles of data received by the first node from the Cloud-based system, and wherein the set of data dissemination rules is selected from two or more sets of data dissemination rules comprising a first set of data dissemination rules for a downstream direction of transfer of bundles of data through the network and a second set of data dissemination rules for an upstream direction of transfer of bundles of data through the network.

25. The system according to claim 24, wherein the upstream direction is towards the Cloud-based system and the downstream direction is away from the Cloud-based system.

26. The system according to claim 21, wherein the first node is configured for operation at a fixed geographic location.

27. The system according to claim 21, wherein the second node is configured for operation in a vehicle movable about a service area of the network.

28. The system according to claim 21, wherein the second node is a mobile access point configured to wirelessly communicate via the network, data of end-user devices accessing the network via the mobile access point.

29. The system according to claim 21, wherein transmitting the at least one bundle of data from the first node to the second node comprises determining that a number of available wireless communication links at the first node is two or more, based on the wireless network context information indicative of quality of communication of the first node with the one or more other nodes.

30. The system according to claim 29, wherein transmitting the at least one bundle of data from the first node to the second node via two or more wireless communication links comprises replicating each bundle of data of the at least one bundle of data to enable transmission of a copy of the at least one bundle of data by the first node via a respective wireless communication link.

* * * * *